US005901805A

United States Patent [19]

Murakami et al.

[11] Patent Number: 5,901,805

[45] Date of Patent: May 11, 1999

[54] AUTOMATICALLY GUIDED VEHICLE

[75] Inventors: Takao Murakami; Susumu Sugawa; Norikuni Miyaoka, all of Tokyo, Japan

[73] Assignee: Japan Tobacco Inc., Tokyo, Japan

[21] Appl. No.: 08/740,687

[22] Filed: Nov. 1, 1996

[30] Foreign Application Priority Data

Nov. 2, 1995 [JP] Japan .................................... 7-286019

[51] Int. Cl.[6] ........................................................ B62D 1/24

[52] U.S. Cl. ........................... 180/168; 180/214; 180/253

[58] Field of Search .................................... 180/168, 211, 180/214, 252, 253; 318/580, 587

[56] References Cited

U.S. PATENT DOCUMENTS

| | | | |
|---|---|---|---|
| 3,788,444 | 1/1974 | McWilliams | 180/253 |
| 3,887,095 | 6/1975 | Suzuki | 180/253 |
| 4,078,630 | 3/1978 | Krieg | 180/168 |
| 4,588,041 | 5/1986 | Tsuchihashi | 180/168 |
| 4,729,449 | 3/1988 | Holmquist | 180/168 |
| 5,609,220 | 3/1997 | Moriya et al. | 180/253 |

FOREIGN PATENT DOCUMENTS

| | | | |
|---|---|---|---|
| 62-210173 | 9/1987 | Japan . | |
| 62-210174 | 9/1987 | Japan | 180/168 |
| 6309029 | 11/1994 | Japan . | |

*Primary Examiner*—Robert J. Oberleitner
*Assistant Examiner*—Michael Cuff
*Attorney, Agent, or Firm*—Birch, Stewart, Kolasch & Birch, LLP

[57] ABSTRACT

An automatically guided vehicle includes a single-wheel unit including a first wheel, a paired-wheel unit including second and third wheels, a sensor for detecting a track, a control unit, etc. The first and second wheels are drive wheels that are rotated by motors, individually, while the third wheel is an idler wheel. The control unit executes an angle steering mode during a forward movement or the like and a speed difference steering mode during a sidewise or slantwise movement. In the angle steering mode, the steering angle of that wheel unit, out of the single- and paired-wheel units, which is situated on the rear side in the moving direction is fixed, and the steering angle of the wheel unit on the front side is controlled. In the speed difference steering mode, the guided vehicle is steered along the track by differentiating the respective rotational speeds of the first and second wheels with the respective steering angles of the individual wheels fixed. The control unit selects the speed difference steering mode when the steering angles are set at values such that the first and second wheels are situated on the opposite sides with respect to a line segment in the steering direction passing through the center of gravity of the guided vehicle.

5 Claims, 17 Drawing Sheets

40 20 2 M G 3 4 21

FORWARD (θ=0°)

40 M 2 G 3 4 21

SLANTWISE (θ=40°)

2 20 40 G L1 M 3 L2 21 4

SIDEWISE (θ=90°)

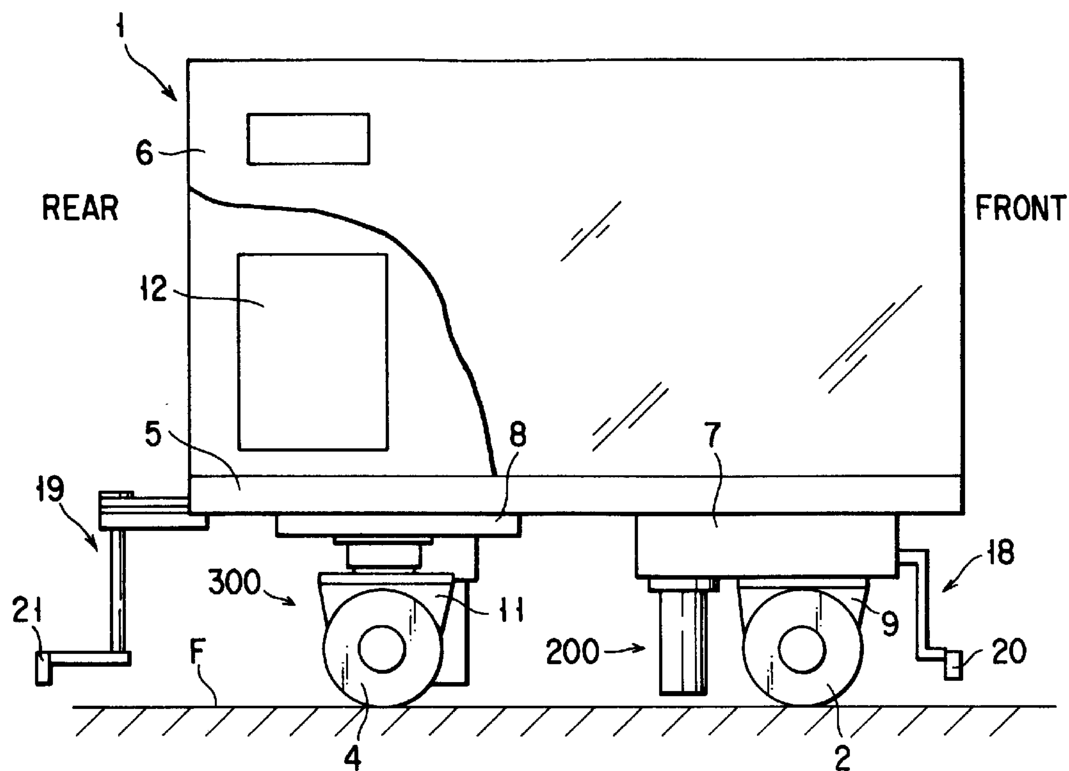
F I G. 1A
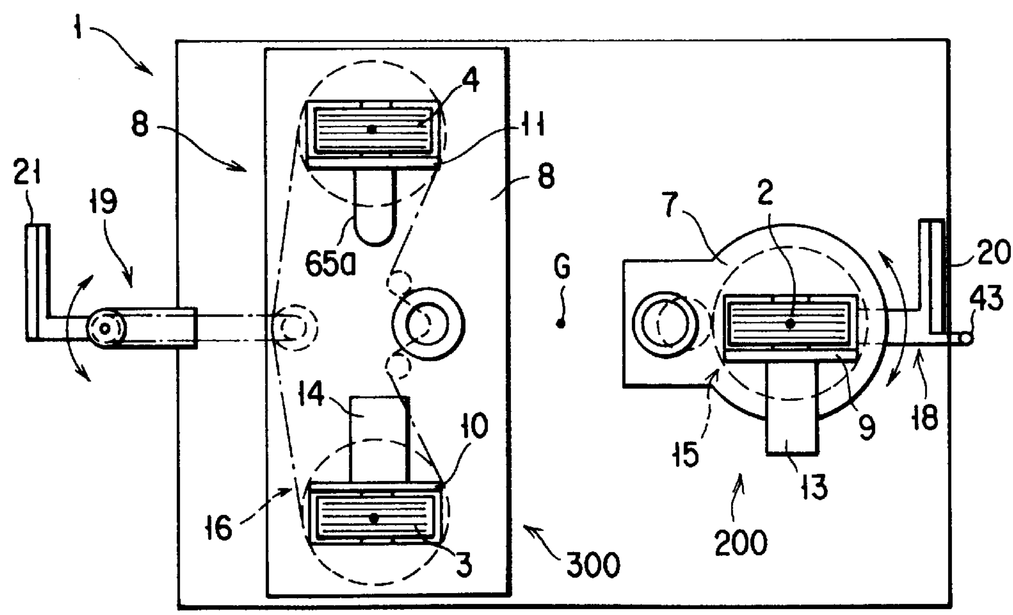
F I G. 1B

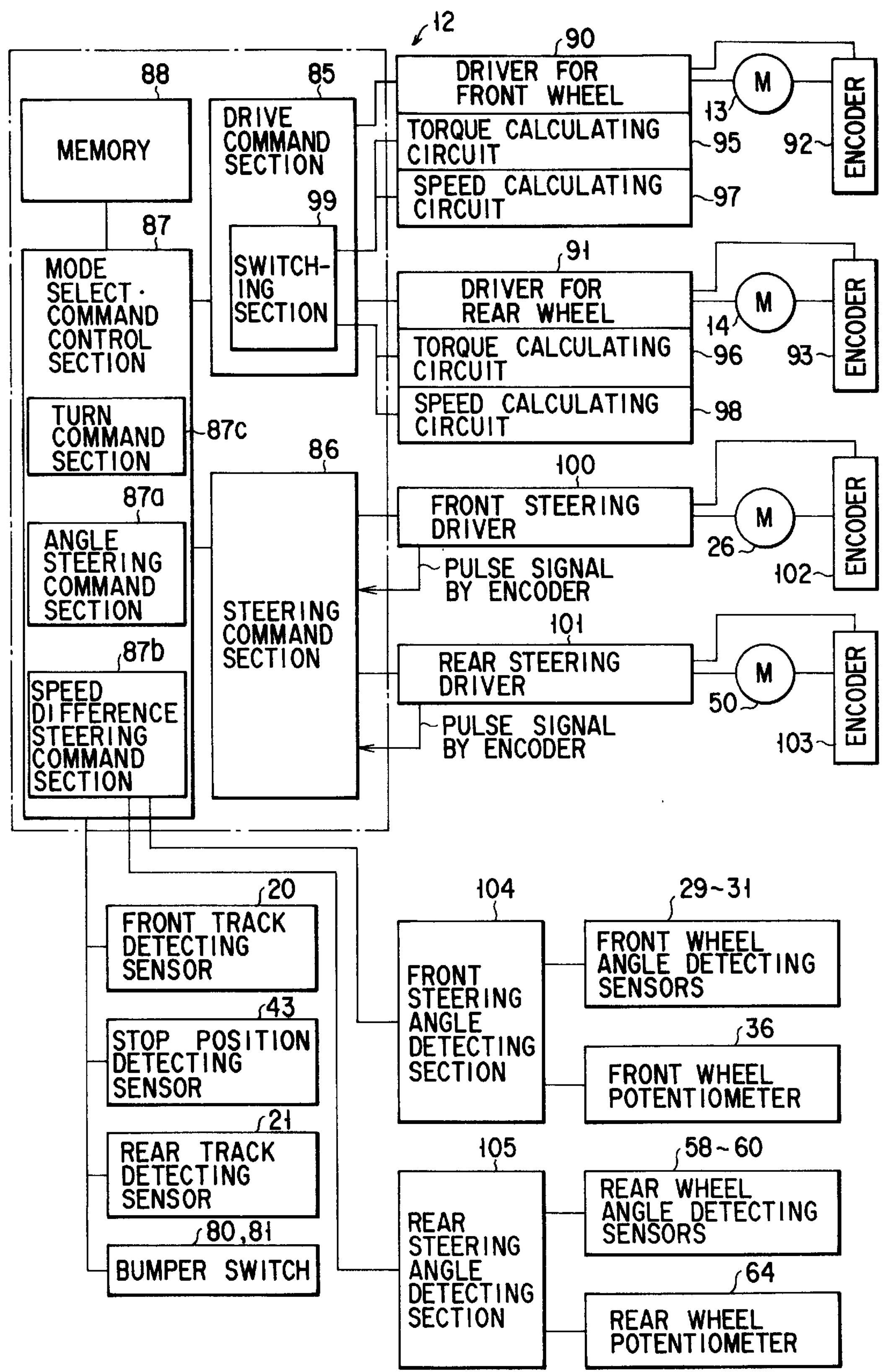
F I G. 8

| | ADVANCE | | | | | | | |
|---|---|---|---|---|---|---|---|---|
| MOVING DIRECTION | $\theta = 0°$ (FORWARD) | | $0 < \theta < \theta x$ (SLANTWISE) | | $\theta x \leqq \theta < 90°$ (SLANTWISE) | | $\theta = 90°$ (SIDEWISE) | |
| | FRONT WHEEL | REAR WHEEL | FRONT WHEEL | REAR WHEEL | FRONT WHEEL | REAR WHEEL | FRONT WHEEL | REAR WHEEL |
| SPEED | ○ | × | ○ | × | ○ | ○ | ○ | ○ |
| TORQUE | × | ○ | × | ○ | × | × | × | × |
| STEERING ANGLE θ | NOT FIXED | 0° FIXED | NOT FIXED | θ FIXED | θ FIXED | θ FIXED | 90° FIXED | 90° FIXED |
| STEERING MODE | ANGLE STEERING MODE (FRONT WHEEL) | | ANGLE STEERING MODE (FRONT WHEEL) | | SPEED DIFFERENCE STEERING MODE (FRONT AND REAR WHEELS) | | SPEED DIFFERENCE STEERING MODE (FRONT AND REAR WHEELS) | |

θx : THE FRONT AND REAR WHEELS ARE SITUATED ON THE OPPOSITE SIDES WITH RESPECT TO THE SEGMENT M IN THE STEERING DIRECTION PASSING THROUGH THE GRAVITY CENTER G IF $\theta > \theta x$ IS GIVEN

FRONT WHEEL = FIRST WHEEL
REAR WHELL = SECOND WHEEL

○ : CONTROLLED
× : NOT CONTROLLED

FIG. 9

| | RETREAT | | | | | | | |
|---|---|---|---|---|---|---|---|---|
| MOVING DIRECTION | $\theta = 0°$ (BACKWARD) | | $0 < \theta < \theta x$ (SLANTWISE) | | $\theta x \leqq \theta < 90°$ (SLANTWISE) | | $\theta = 90°$ (SIDEWISE) | |
| | FRONT WHEEL | REAR WHEEL | FRONT WHEEL | REAR WHEEL | FRONT WHEEL | REAR WHEEL | FRONT WHEEL | REAR WHEEL |
| SPEED | × | ○ | × | ○ | ○ | ○ | ○ | ○ |
| TORQUE | ○ | × | ○ | × | × | × | × | × |
| STEERING ANGLE $\theta$ | 0° FIXED | NOT FIXED | $\theta$ FIXED | NOT FIXED | $\theta$ FIXED | $\theta$ FIXED | 90° FIXED | 90° FIXED |
| STEERING MODE | ANGLE STEERING MODE (REAR WHEEL) | | ANGLE STEERING MODE (REAR WHEEL) | | SPEED DIFFERENCE STEERING MODE (FRONT AND REAR WHEELS) | | SPEED DIFFERENCE STEERING MODE (FRONT AND REAR WHEELS) | |

$\theta x$ : THE FRONT AND REAR WHEELS ARE SITUATED ON THE OPPOSITE SIDES WITH RESPECT TO THE SEGMENT M IN THE STEERING DIRECTION PASSING THROUGH THE GRAVITY CENTER G IF $\theta > \theta x$ IS GIVEN

FRONT WHEEL = FIRST WHEEL
REAR WHELL = SECOND WHEEL

○ : CONTROLLED
× : NOT CONTROLLED

FIG. 10

| | SPIN-TURN | | SPIN-TURN | |
|---|---|---|---|---|
| | θ = 90° | | θ = 180° | |
| | FRONT WHEEL | REAR WHEEL | FRONT WHEEL | REAR WHEEL |
| SPEED | ○ | ○ | ○ | ○ |
| TORQUE | × | × | × | × |
| STEERING ANGLE θ | 90° FIXED | 0° FIXED | 90° FIXED | 0° FIXED |
| STEERING MODE | SPEED DIFFERENCE STEERING MODE (FRONT AND REAR WHEELS) | | SPEED DIFFERENCE STEERING MODE (FRONT AND REAR WHEELS) | |

FRONT WHEEL = FIRST WHEEL
REAR WHELL = SECOND WHEEL

○ : CONTROLLED
× : NOT CONTROLLED

FIG. 11

FORWARD (θ=0°)

SLANTWISE (θ=10°)

SLANTWISE (θ=20°)

SLANTWISE (θ=30°)

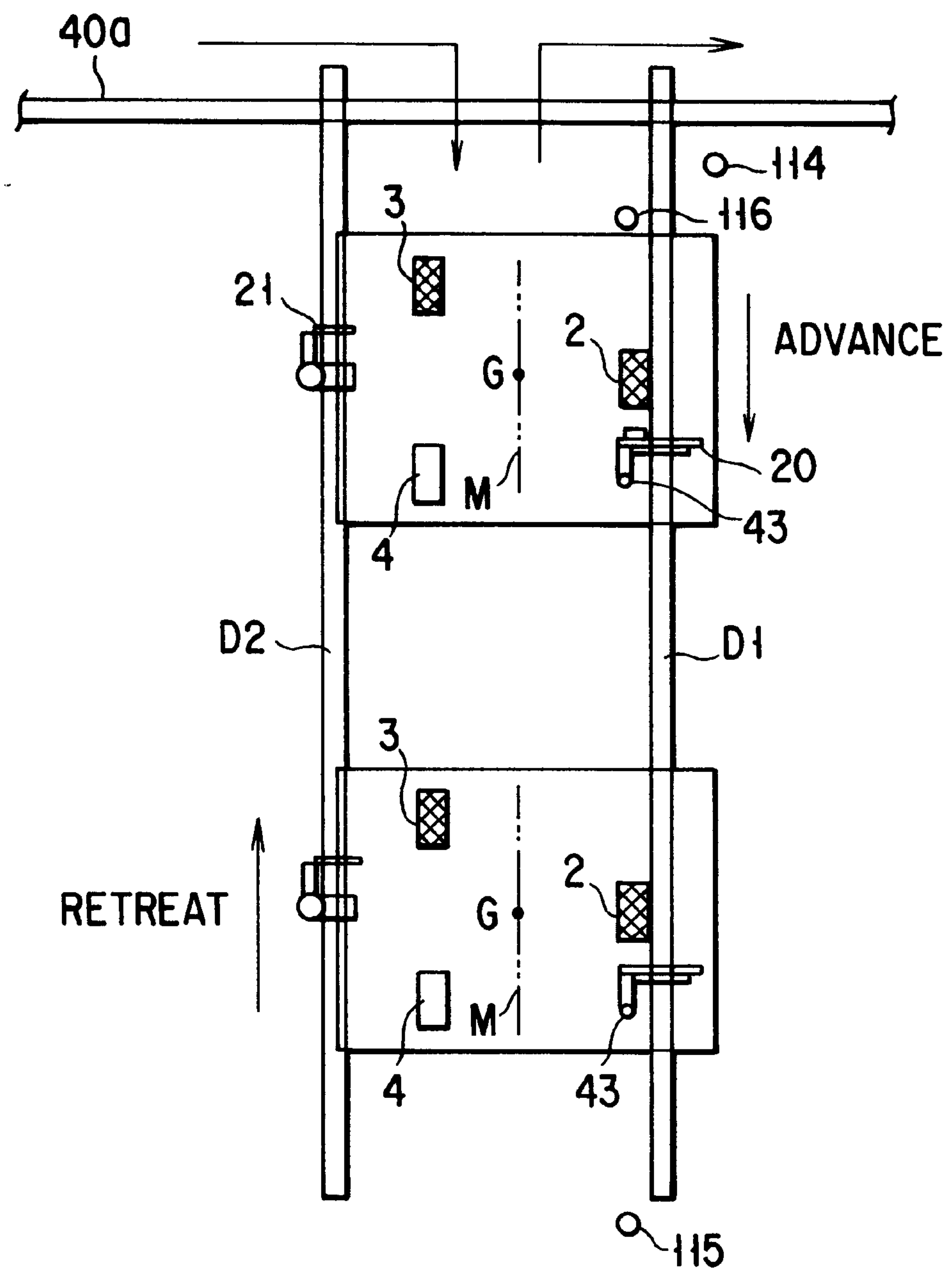
F I G. 19

AUTOMATICALLY GUIDED VEHICLE

BACKGROUND OF THE INVENTION

1. Field of the Invention

The present invention relates to an automatically guided vehicle used with an automatic guidance system in an automatic storehouse or the like.

2. Description of the Related Art

An automatic storehouse, for example, is furnished with an unmanned automatically guided vehicle for transporting articles. The guided vehicle travels along a track formed of, e.g., white lines or aluminum foil sheet on a floor. This track is composed of a basic track arranged like a circuit in the storehouse and sidewise or slantwise tracks diverging from the basic track. The guided vehicle runs along these tracks and reciprocates between the basic track and article transfer stations in the storehouse.

One such automatically guided vehicle is described in Jpn. Pat. Appln. KOKAI Publication No. 6-309029 (Prior Art 1). This guided vehicle is provided with two front wheels and two rear wheels. One of the two front wheels is a drive wheel that is rotated by means of a motor for travel, while the other is an idler wheel capable of free rotation. Likewise, the rear wheels include a drive wheel and an idler wheel. Each drive wheel is swingable around a vertical axis, and is driven so as to be pointed in a desired steering direction by means of a motor for steering. Each idler wheel is supported for rotation around a vertical axis. If the drive wheels are steered, therefore, the idler wheels change their directions as the guided vehicle travels.

On the other hand, an example of a three-wheel automatically guided vehicle is described in Jpn. Pat. Appln. KOKAI Publication No. 62-210173 (Prior Art 2). This guided vehicle is provided with one front wheel and two rear wheels. The front wheel is driven by means of a motor for travel, and one of the rear wheels is connected to the motor by means of a chain, sprockets, magnetic clutch, etc. When the vehicle is advanced, the clutch is released so that only the front wheel is driven. The front and rear wheels are connected by means of a steering cam system so that the rear wheels can be steered in association with the front wheel. In moving the guided vehicle of Prior Art 2 sideways, the respective steering angles of the front and rear wheels are both set at 90°. If the clutch is thrown in, the front and rear wheels are rotated simultaneously. When the front wheel is rotated by means of the motor for travel, in this case, the rear wheels are rotated through the medium of the chain and the sprockets, whereupon the vehicle moves sideways.

The guided vehicle of Prior Art 1 has a four-wheel structure, including the two front wheels and the two rear wheels. If the floor or ground surface is rough, therefore, only three of the four wheels of the vehicle may possibly be allowed to touch the surface at a time, so that the vehicle may operate with one of its wheels off the surface, in some cases. In this situation, the vehicle is supported by only those wheels which are in contact with the ground surface, so that it is unbalanced and unstable as it travels, and sometimes meanders. It is not easy, moreover, to make this guided vehicle compact, owing to the use of the four wheels and the motors for travel and steering on both sides, front and rear. There is a tendency for modern automatically guided vehicles to require a depressed vehicle floor and more compact underside. The vehicle of Prior Art 1 cannot, however, meet this requirement. According to the automatically guided vehicle of Prior Art 2, on the other hand, the front and rear wheels are steered simultaneously by means of the cam mechanism as the vehicle moves sideways. Once the steering direction of any of the wheels shifts from any cause, therefore, it cannot be stabilized.

SUMMARY OF THE INVENTION

Accordingly, the object of the present invention is to provide a compact automatically guided vehicle, which can be steered appropriately in an intended direction during a forward, slantwise, or sidewise movement, and can run steadily without meandering.

In order to achieve the above object, a guided vehicle according to the present invention is an automatically guided vehicle capable of traveling on a floor provided with a fixed track, which comprises: a base including a front portion and a rear portion; a single-wheel unit including a first wheel attached to one of the front and rear portions of the base and supported on the base so as to be swingable around a vertical axis; a paired-wheel unit including second and third wheels arranged right and left and independently of each other on the other of the front and rear portions of the base and supported on the base so as to be swingable around vertical axes, individually; first rotating means including a motor for travel used to rotate the first wheel; first steering means including a motor for steering used to swing the first wheel around the vertical axis; second rotating means including a motor for travel used to rotate the second and/or third wheel independently of the first wheel; second steering means including a motor for steering used to swing the second and/or third wheel around the vertical axis or axes independently of the first wheel; track detecting means for detecting the track; and a control unit for controlling the first and second rotating means and the first and second steering means, the control unit including means for rotating the individual wheels of the single-wheel unit and the paired-wheel unit independently of one another, thereby running the guided vehicle, and controlling the single-wheel unit and/or the paired-wheel unit in a direction such that a deviation in position between the track and the guided vehicle detected by the track detecting means is corrected, thereby steering the guided vehicle.

The automatically guided vehicle of the invention is a three-wheel guided vehicle that is provided with the first, second, and third wheels, and travels along the track in a manner such that the individual wheels are driven and steered independently of one another to correct deviations from the track. Thus, any of the wheels of this three-wheel vehicle can be securely prevented from being lifted off the floor surface, so that the vehicle can avoid losing its balance and thereby meandering. Preferably, the second wheel is a drive wheel rotated by means of the motor for travel, and the third wheel is an idler wheel capable of free rotation.

The control unit includes angle steering means for executing an angle steering mode such that the steering angle of one of the single- and paired-wheel units is controlled with the steering angle of the other unit fixed, thereby correcting the deviation in position between the track and the guided vehicle as the guided vehicle is operated, speed difference steering means for executing a speed difference steering mode such that the respective rotational speeds of the first and second wheels are differentiated from each other with the respective steering angles of the single- and paired-wheel units fixed, thereby correcting the deviation in position between the track and the guided vehicle as the guided vehicle is operated, and steering mode selecting means for selecting the angle steering mode or the speed difference steering mode in accordance with the respective steering angles of the single- and paired-wheel units and delivering a steering command to the angle steering means or the speed difference steering means.

Preferably, the steering mode selecting means selects the speed difference steering mode and delivers the command to the speed difference steering means when the respective steering angles of the single- and paired-wheel units are set at values such that the first and second wheels are situated on the opposite sides with respect to a line segment in the steering direction passing through the center of gravity of the guided vehicle, and selects the angle steering mode and delivers the command to the angle steering means when the steering angles are set at any other values.

The angle steering means includes means for effecting torque control such that a driving torque on that one of the first and second wheels which is situated on the rear side in the moving direction thereof is smaller than a driving torque on the wheel on the front side. With this arrangement, the guided vehicle can avoid meandering as it moves forward or curves.

Preferably, moreover, the control unit includes spin-turn means for spin-turning the guided vehicle by simultaneously rotating the first and second wheels with the steering angle of the first wheel fixed at 90° and with the steering angle of second and third wheels fixed at 0°.

In spin-turning the guided vehicle, the spin-turn means rotates the first and second wheels with a difference in rotational speed such that the ratio between the respective peripheral speeds of the first and second wheels is W1:W2, where W1 and W2 are the wheel base from the first wheel to the middle point between the second and third wheels and half of the tread between the second and third wheels, respectively.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention and, together with the general description given above and the detailed description of the preferred embodiment given below, serve to explain the principles of the invention.

FIG. 1A is a side view showing an automatically guided vehicle according to an embodiment of the present invention;

FIG. 1B is a bottom view of the guided vehicle;

FIG. 8 is a block diagram showing a control system of the vehicle;

FIG. 9 is a map prescribing the steering mode for advance drive of the vehicle;

FIG. 10 is a map prescribing the steering mode for retreat drive of the vehicle;

FIG. 11 is a map prescribing the steering mode for turns of the vehicle;

FIG. 19 is a plan view showing the way the vehicle moves sideways; and

DETAILED DESCRIPTION OF THE PREFERRED EMBODIMENTS

Figure 2:
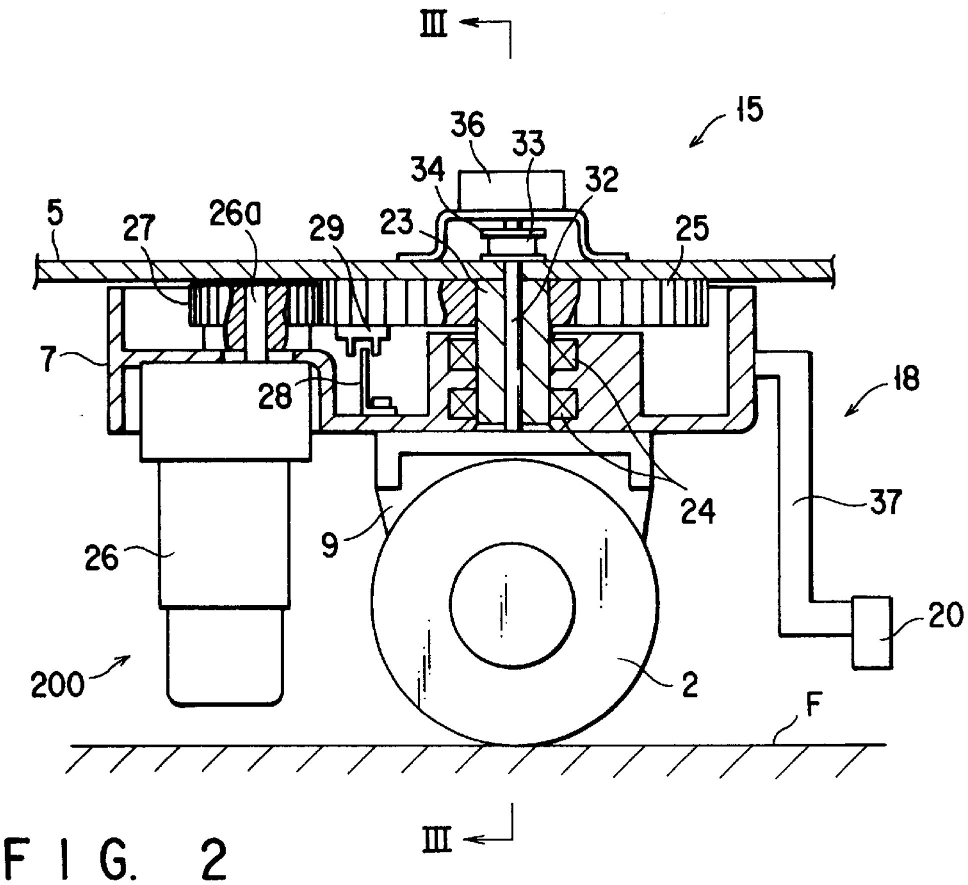
FIG. 2 is a longitudinal sectional view of a first steering mechanism of the vehicle.

An embodiment of the present invention will now be described with reference to the accompanying drawings.

A three-wheel automatically guided vehicle shown in FIGS. 1A and 1B comprises a single-wheel unit 200, which includes a first wheel 2 for use as a front wheel, and a paired-wheel unit 300, which includes second and third wheels 3 and 4 for use as rear wheels. These unit 200 are attached to the underside of a body 1 of the vehicle. The body 1 includes a base 5 having front and rear portions and a cover 6 on the top of the base 5. A front-wheel mounting section 7 is provided on the front portion of the lower surface of the base 5, and a rear-wheel mounting section 8 on the rear portion of the lower surface of the base 5. The first wheel 2 is mounted on the front-wheel mounting section 7 by means of a bracket 9. The second and third wheels 3 and 4 are mounted on the rear-wheel mounting section 8 by means of brackets 10 and 11, respectively. A control unit 12 is disposed inside the cover 6.

As shown in FIG. 1B, a motor 13 for travel, which functions as first rotating means, is mounted on the outer surface of the bracket 9 that supports the first wheel 2. The drive shaft of the motor 13 is connected directly to the rotating shaft of the first wheel 2. A motor 14 for travel, which functions as second rotating means, is mounted on the outer surface of the bracket 10 that supports the second wheel 3. The drive shaft of the motor 14 is connected directly to the rotating shaft of the second wheel 3. Thus, the first and second wheels 2 and 3 are drive wheels, while the third wheel 4 is an idler wheel.

A first steering mechanism 15 is attached to the front-wheel mounting section 7. The mechanism 15 steers the first wheel 2 by steering the mounting section 7 and the bracket 9 around a vertical axis. A second steering mechanism 16 is attached to the rear-wheel mounting section 8. The mechanism 16 steers the second and third wheels 3 and 4 by steering the brackets 10 and 11 around vertical axes, individually. The cover 6 houses several necessary components for the travel of the guided vehicle, including the control unit 12 for controlling the motors 13 and 14 for travel and the steering mechanisms 15 and 16.

First track detecting means 18, which is associated with the first steering mechanism 15, is provided on the front portion of the base 5. Second track detecting means 19, which is associated with the second steering mechanism 16, is provided on the rear portion of the base 5. These detecting means 18 and 19 are provided, respectively, with track detecting sensors 20 and 21 for detecting a track 40 on a floor F of an automatic storehouse. Detection signals from the sensors 20 and 21 are applied to the input of the control 12.

Figure 3:
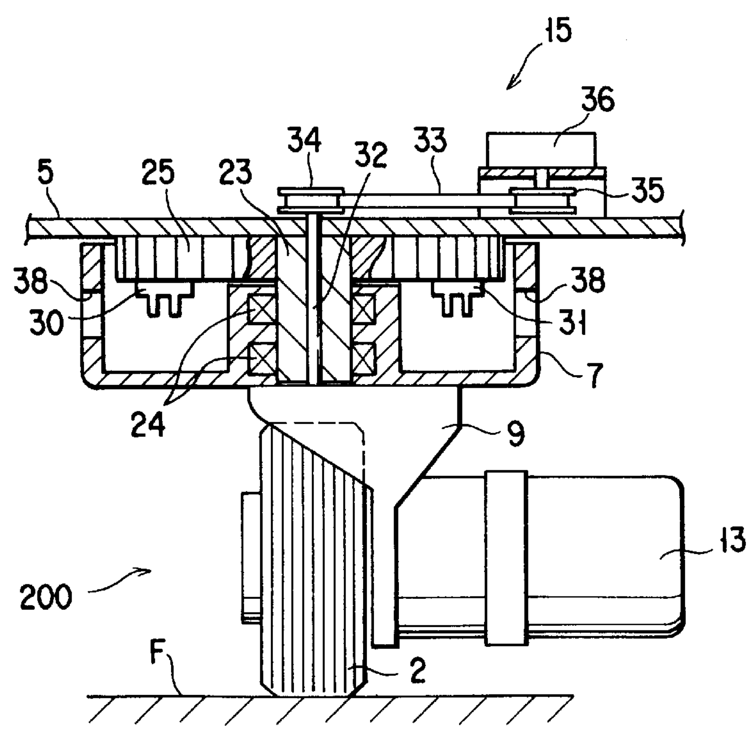
FIG. 3 is a sectional view taken along line III—III of FIG. 2.

The arrangement of the automatically guided vehicle will now be described further in detail. FIGS. 2 and 3 show the first steering mechanism 15. As shown in FIG. 2, a vertical shaft 23 is fixed to the lower surface of the base 5. The front-wheel mounting section 7 is swingably supported on the shaft 23 by means of a pair of bearings 24, upper and lower. The bracket 9 for supporting the first wheel 2 is fixed to the lower surface of the front-wheel mounting section 7, and can swing integrally with the mounting section 7 around the shaft 23.

A gear wheel 25 coaxial with the vertical shaft 23 is fixed to the lower surface of the base 5. A motor 26 for steering is attached to the front-wheel mounting section 7. A drive shaft 26*a* of the motor 26 is fixedly fitted with a pinion 27, which is in mesh with the gear wheel 25. When the shaft 26*a* of the motor 26 is rotated, the pinion 27 rotates around the vertical shaft 23 while maintaining the engagement with the gear wheel 25. Thus, the steering angle of the first wheel 2 can be changed by turning the mounting section 7 around the shaft 23.

The single-wheel unit 200, which includes the first wheel 2, is provided with three steering angle detecting means. First detecting means includes a sensor plate 28 (shown in FIG. 2), a sensor 29 (e.g., phototube) for 0° detection, sensors 30 and 31 for clockwise- and counterclockwise-90° detection (shown in FIG. 3), etc. The sensor plate 28 is situated opposite the gear wheel 25 inside the front-wheel mounting section 7. The sensor 29 for 0° detection is situated oppositably the sensor plate. The sensors 30 and 31 for clockwise- and counterclockwise-90° detection are situated at 90° to the sensor 29 for 0° detection in the clockwise and counterclockwise directions, respectively. The first detecting means can detects that the steering angle of the first wheel 2 at 0°, clockwise-90°, or counterclockwise-90°.

Second detecting means has a thin shaft 32, the lower end of which is fixed to the bracket 9. The shaft 32 penetrates the vertical shaft 23 and projects above the upper surface of the base 5. Thus, the shaft 32, along with the bracket 9, is swingable in the steering direction of the first wheel 2. As shown in FIG. 3, a pulley 34 is provided on the upper end of the thin shaft 32. Also, a potentiometer 36 is provided with a pulley 35. A timing belt 33 is passed around and between the pulleys 34 and 35. The potentiometer 36 detects the swinging angle of the shaft 32, that is, the steering angle of the first wheel 2, as an analog signal.

Third detecting means is an encoder 102 (see FIG. 8) that is attached to the first motor 26 for steering. The encoder 102 detects the steering angle of the first wheel 2 as a pulse signal. In brief, according to this embodiment, the steering angle of the first wheel 2 is detected by using the aforesaid three detecting means in combination.

The following is a description of the first track detecting means 18. As shown in FIG. 2, the detecting means 18 includes a bracket 37. The upper end of the bracket 37 is fixed to the front face of the front-wheel mounting section 7. The lower end portion of the bracket 37 is situated close to the floor F. The sensor 20 for detecting the track 40 on the floor F is mounted on the lower end portion of bracket 37.

Figure 4A:
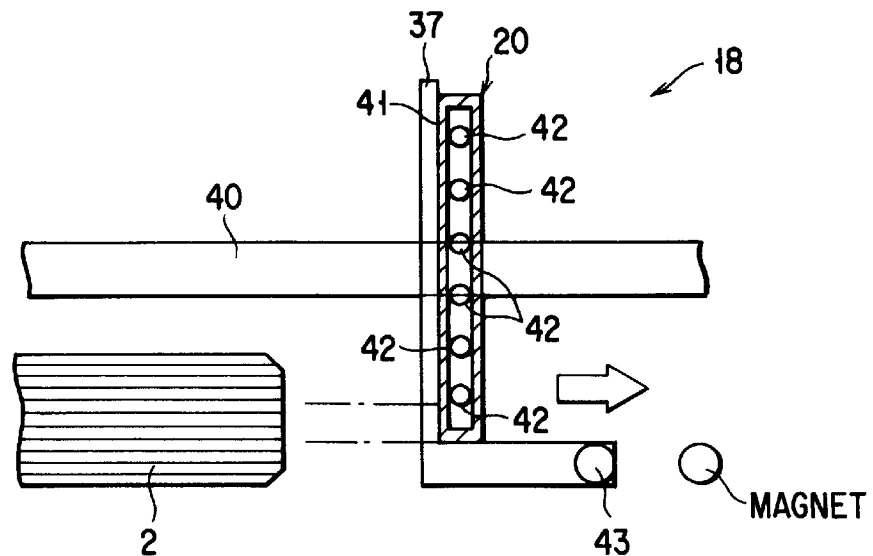
FIG. 4A is a plan view showing the relative positions of a sensor for track detection and a track on which the vehicle moves forward.
Figure 4B:
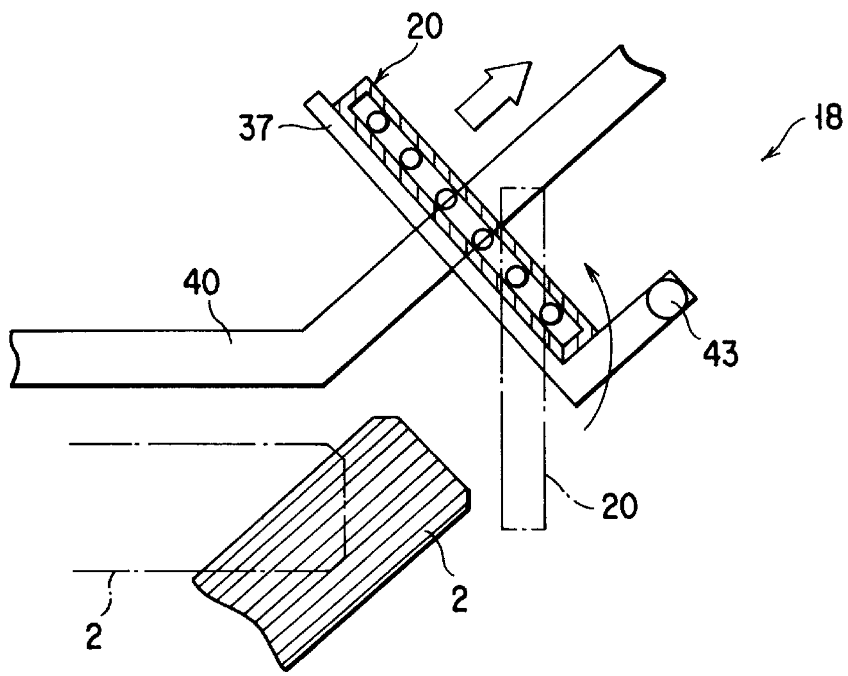
FIG. 4B is a plan view showing the relative positions of the sensor for track detection and the track on which the vehicle moves slantwise.

FIGS. 4A and 4B diametrically show the relative positions of the sensor 20 for track detection and the first wheel 2. The track 40 may be formed of white lines, aluminum foil sheet, or magnetic tape, for example. In the case where the track 40 is formed of a magnetic tape, the sensor 20 is provided with a horizontally extending case 41 and a plurality of magnetic sensor elements 42 arranged at regular intervals in the case 41. Each interval between the sensor elements 42 is adjusted so that an integral multiple of it is equal to the width of the track 40, for example. Thus, the deviation of the track 40 from the center of the sensor 20 can be detected in accordance with detection signals from the individual sensor elements 42 for the track 40.

When the first wheel 2 is steered so that the track 40 is situated in the center of the sensor 20 as the guided vehicle travels, the front-wheel mounting section 7 swings, so that the bracket 37 also turns. If the first wheel 2-is steered in accordance with the direction of the track 40 when the track 40 turns, as shown in FIG. 4B, for example, the sensor 20 also turns correspondingly. Thus, the sensor 20 is always situated in front of the first wheel 2 in the moving direction. thereof, extending at right angles to the track 40. The bracket 37 is provided with a sensor 43 for stop position detection. The sensor 43 is used to detect a stopper magnet (shown in FIG. 4A), which is located in a position at which the guided vehicle is to be stopped. When the magnet is detected by the sensor 43, as mentioned later, the motors 13 and 14 for travel are stopped.

Figure 5A:
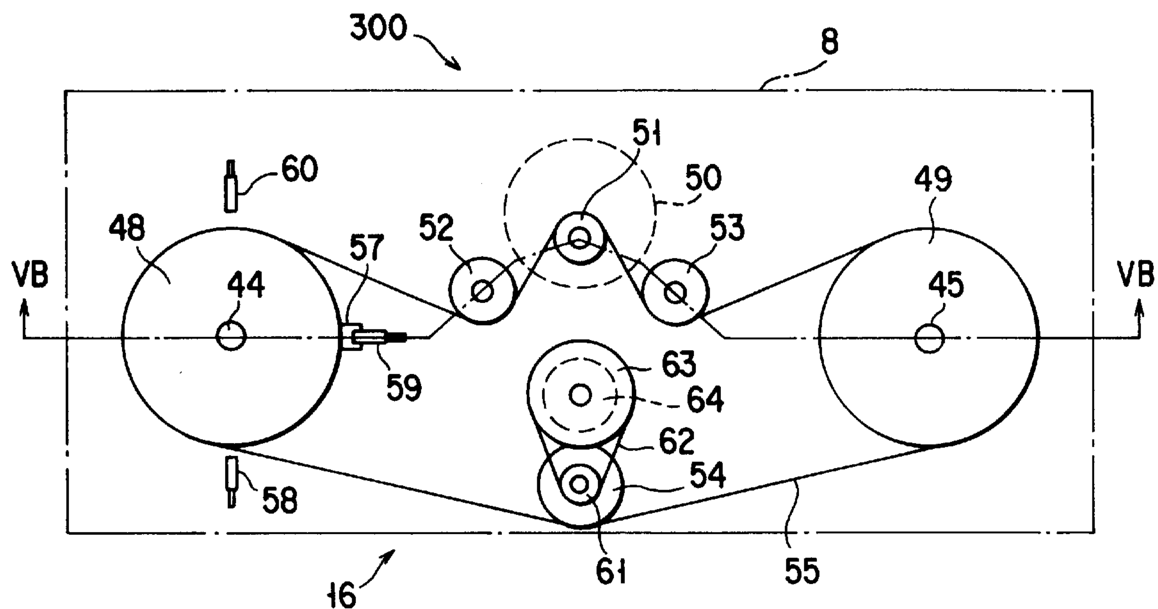
FIG. 5A is a plan view of a second steering mechanism of the vehicle.
Figure 5B:
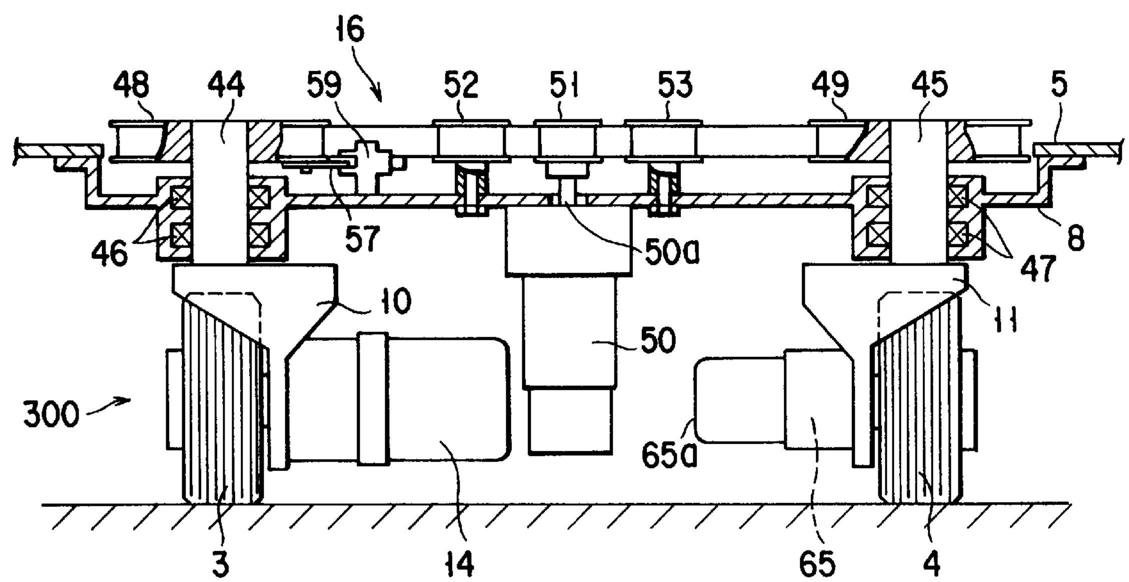
FIG. 5B is a sectional view taken along line VB—VB of FIG. 5A.

Referring now to FIGS. 5A and SB, the second steering mechanism 16 will be described. In FIG. 5B, the rear-wheel mounting section 8 is provided on the lower surface of the base 5. Vertical shafts 44 and 45 are fixed to the upper end of the bracket 10, which supports the second wheel 3, and the upper end of the bracket 11, which supports the third wheel 4, respectively. The one vertical shaft 44 is rotatably supported on the mounting section 8 by means of a pair of bearings 46, upper and lower. Likewise, the other vertical shaft 45 is rotatably supported on the mounting section 8 by means of a pair of bearings 47, upper and lower. Pulleys 48 and 49 are fixed to the upper end portions of the shafts 44 and 45, respectively.

A motor 50 for steering is attached to the central portion of the rear-wheel mounting section 8. A pulley 51 is provided on the upper end of a drive shaft 50*a* of the motor 50, on the same height level as the pulleys 48 and 49. Rotatable idlers 52 and 53 are provided between the pulleys 48 and 51 and between the pulleys 49 and 51, respectively. As shown in FIG. 5A, an idler 54 is also provided between the pulleys 48 and 49. An endless gear belt is passed around and between the pulleys 48, 49 and 51 and the idlers 52, 53 and 54. When the pulley 51 on the driving side rotates as the shaft 50*a* of the motor 50 for steering rotates, therefore, the pulleys 48 and 49 on the driven side rotate for the same angle in the same direction through the medium of the belt 55. Thus, the second and third wheels 3 and 4 are steered.

In order to detect the steering angle of the second and third wheels 3 and 4, the second steering mechanism 16, like the first steering mechanism 15, is provided with three steering angle detecting means. First detecting means includes a sensor plate 57 attached the driven pulley 48, a sensor 58 for clockwise-90° detection, a sensor 59 for 0° detection, and a sensor 60 for counterclockwise-90° detection. The sensor 58 for clockwise-90° detection detects the plate 57 by facing it when the steering angle of the second wheel 3 is at clockwise-90°. The sensor 59 for 0° detection detects the sensor plate 57 when the steering angle of the wheel 3 is at 0°. Further, the sensor 60 for counterclockwise-90° detection detects the sensor plate 57 by facing it when the steering angle of the second wheel 3 is at counterclockwise-90°.

As shown in FIG. 5A, second detecting means includes a first pulley 61 for detection fixed on the same axis as the idler 54, a second pulley 63 for detection connected to the pulley 61 by means of a timing belt 62, a potentiometer 64 connected to the pulley 63, etc. The potentiometer 64 outputs pulses corresponding to the rotational angle of the pulleys 48 and 49, that is, the steering angle of the second and third wheels 3 and 4. Third detecting means is an encoder 103 (see FIG. 8) that is attached to the motor 50 for steering. The encoder 103 outputs pulses corresponding to the rotational angle of the motor 50, that is, the steering angle of the second and third wheels 3 and 4.

As shown in FIG. 5B, a housing 65*a* is fixed to the bracket 11 that supports the third wheel 4. The housing 65*a* contains therein a speed sensor 65 for detecting the rotational speed of the third wheel 4. The sensor 65 is used to obtain the difference between the respective rotational speeds of the second and third wheels 3 and 4. Whether or not the guided vehicle is meandering is determined by this speed difference. The housing 65*a*, having the sensor 65 therein, serves also as a balancer for weight balancing with the motor 14 for travel.

Figure 6A:
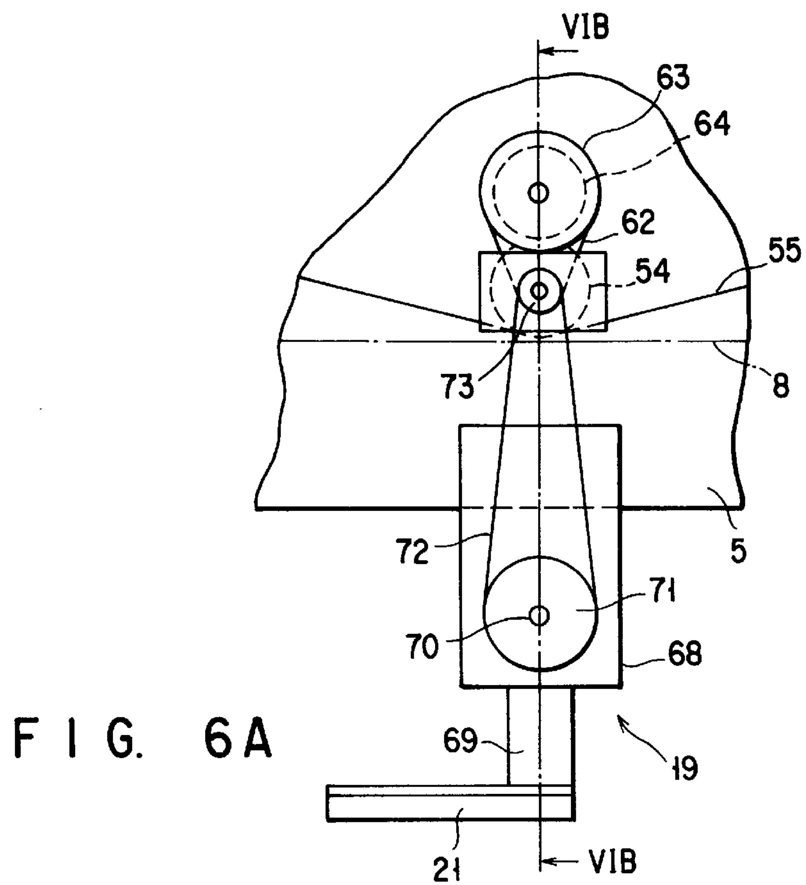
FIG. 6A is a plan view showing part of second track detecting means of the vehicle.
Figure 6B:
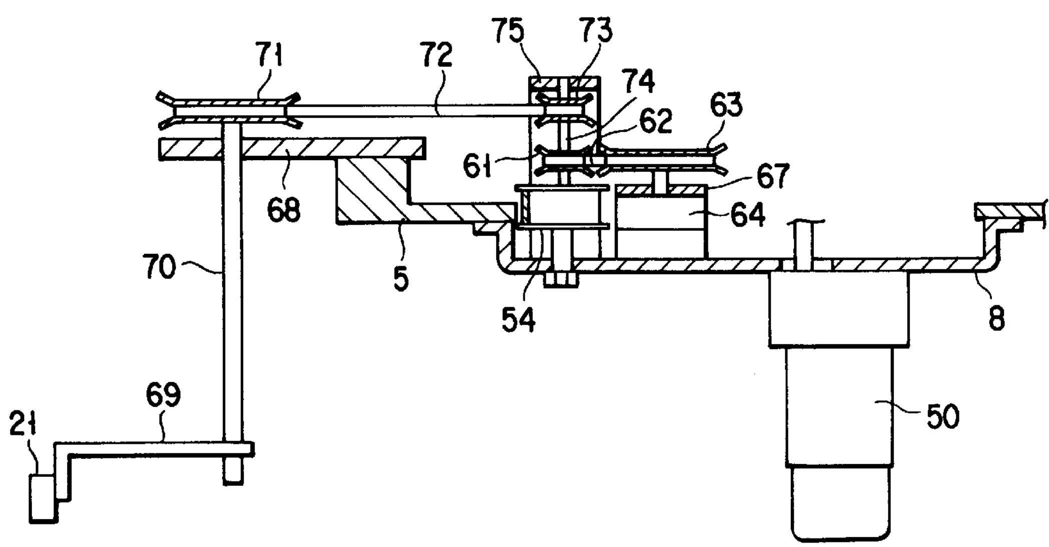
FIG. 6B is a sectional view taken along line VIB—VIB of FIG. 6A.

Referring now to FIGS. 6A and 6B, the second track detecting means 19 will be described. As shown in FIG. 6B, the potentiometer 64 is held under the second pulley 63 for detection by means of a bracket 67 that is set up on the rear-wheel mounting section 8. The second track detecting means 19 includes a holder 68 that is fixed to the rear portion of the base 5. The distal end portion of the holder 68 projects backward from the the base 5. A bracket 69 is supported on the distal end portion of the holder 68 by means of a vertical shaft 70. The bracket 69 is swingable within a horizontal plane around the shaft 70. The sensor 21 for track detection is attached to the lower end of the bracket 69. A first pulley 71 is provided on the upper end of the shaft 70. A timing belt 72 is passed around and between the first pulley 71 and a second pulley 73. The second pulley 73, pulley 61 for detection, and idler 54 are all fixed to a rotating shaft 74. The shaft 74 is rotatably supported by a bracket 75. When the idler 54 rotates, therefore, the pulleys 61 and 73 integrally rotate in the same direction.

The respective outside diameters of the first and second pulleys 71 an 73 are adjusted so that the rotational angle of the shaft 70 is equal to the steering angle of the second and third wheels 3 and 4. Accordingly, the sensor 21 for track detection can turn in the same direction and at the same angle as the steering direction and angle of the second and third wheels 3 and 4. The sensor 21 is constructed substantially in the same manner as the first sensor 20 for track detection shown in FIG. 4A. More specifically, the sensor 21 includes a case (not shown) and a plurality of magnetic sensor elements arranged at regular intervals in the case. The deviation between the track 40 and the sensor 21 can be detected in accordance with track detection signals from the individual sensor elements.

Figure 7A:
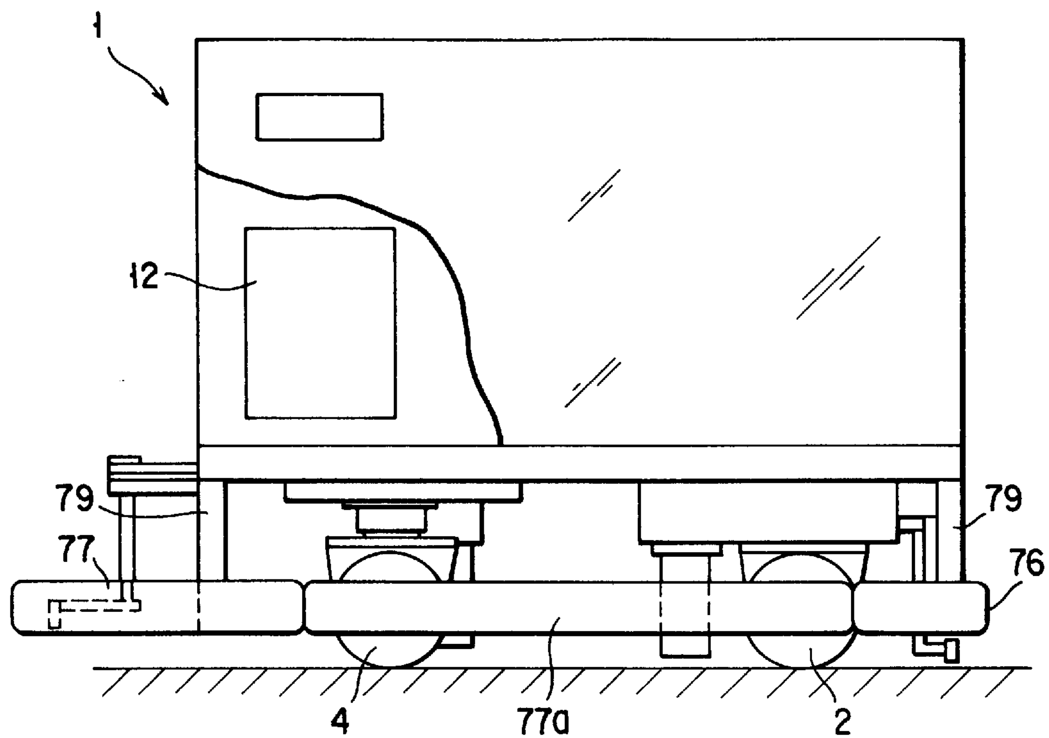
FIG. 7A is a side view of the vehicle fitted with bumpers.
Figure 7B:
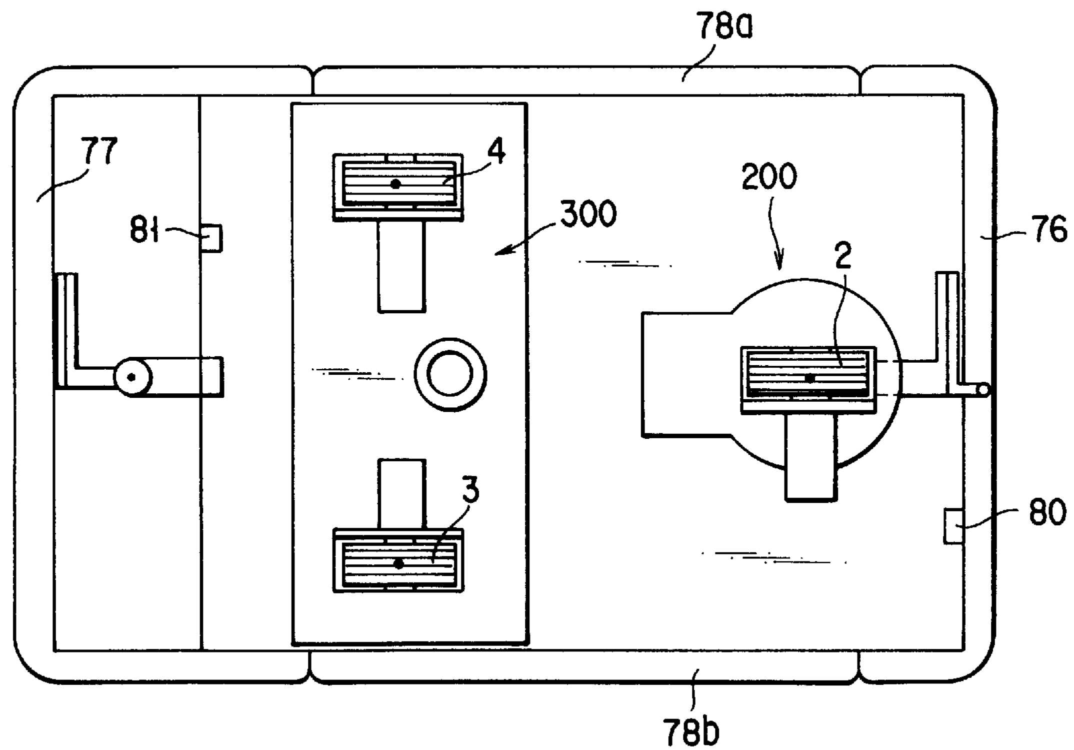
FIG. 7B is a bottom view of the vehicle fitted with the bumpers.

As shown in FIGS. 7A and 7B, front and rear bumpers 76 and 77 and side bumpers 78*a* and 78*b* for protecting the wheels 2, 3 and 4 against obstacles are fixed to the lower part of the body 1 by means of a support frame 79. Bumper switches 80 and 81 are attached to the front and rear bumpers 76 and 77, respectively. If the bumpers 76 and 77 come into contact with any obstacles or the like, the switches 80 and 81 are activated to detect the contact.

Referring now to the block diagram of FIG. 8 and the like, the control unit 12 will be described. The unit 12 comprises a drive command section 85 for outputting drive commands for rotating the wheels 2, 3 and 4, a steering command section 86 for outputting steering commands for the wheels 2, 3 and 4, a steering mode selection/command control section 87, and a storage section 88 for storing the steering mode. The control section 87 has a function to effect control corresponding to the steering mode by selecting the steering mode that corresponds to the moving direction (for forward, backward, sidewise, or slantwise advance or retreat) of the guided vehicle and delivering commands to the drive command section 85 and the steering command section 86.

The storage section 88 is stored with maps, such as the ones shown in FIGS. 9 to 11, for example. The steering mode selection/command control section 87 selects the steering mode by utilizing the maps depending on the vehicle behavior, advance or retreat, the steering angle, etc. Further, the control section 87 controls the drive command section 85 and the steering command section 86 by means of an angle steering command section 87*a* as angle steering means, a speed difference steering command section 87*b* as speed difference steering means, and a turn command section 87*c* as spin-turn means.

Figure 12A:
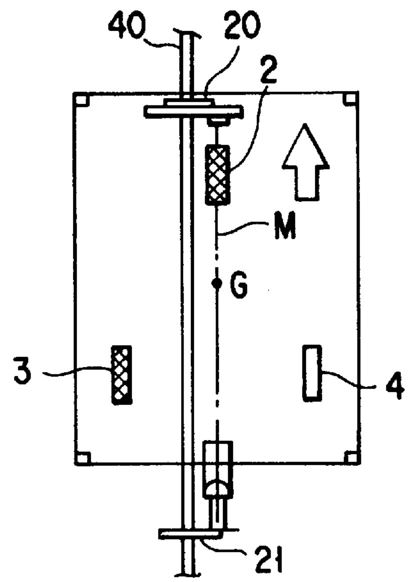
FIG. 12A is a diagram showing the relative positions of wheels and the track on which the vehicle moves forward.
Figure 12B:
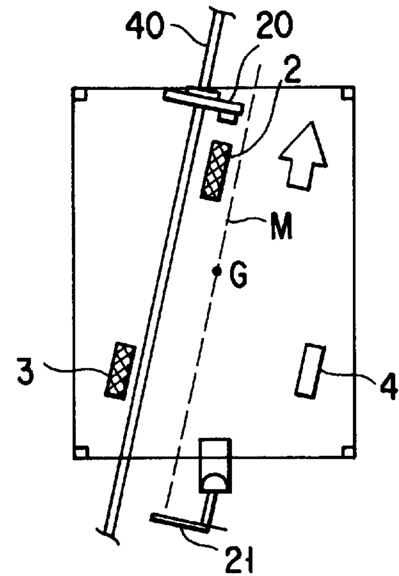
FIG. 12B is a diagram showing the relative positions of the wheels and the track on which the vehicle moves slantwise at 10°.
Figure 12C:
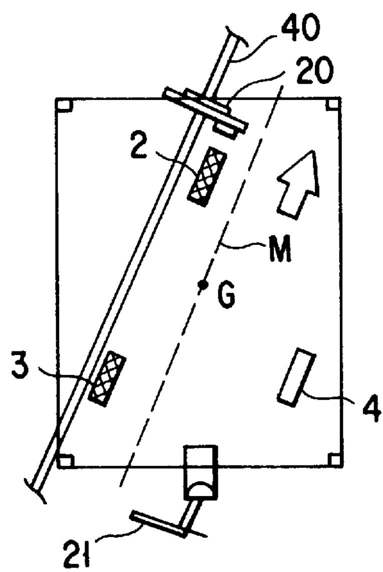
FIG. 12C is a diagram showing the relative positions of the wheels and the track on which the vehicle moves slantwise at 20°.
Figure 12D:
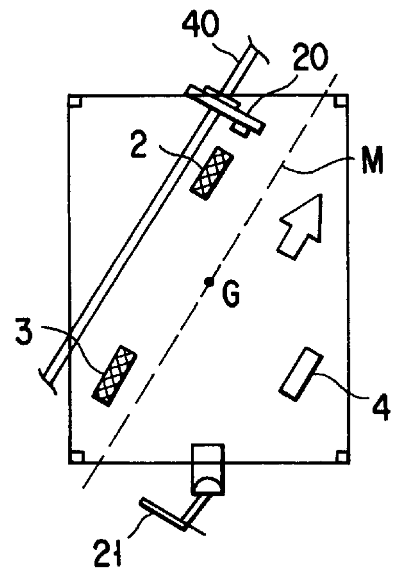
FIG. 12D is a diagram showing the relative positions of the wheels and the track on which the vehicle moves slantwise at 30°.
Figure 12E:
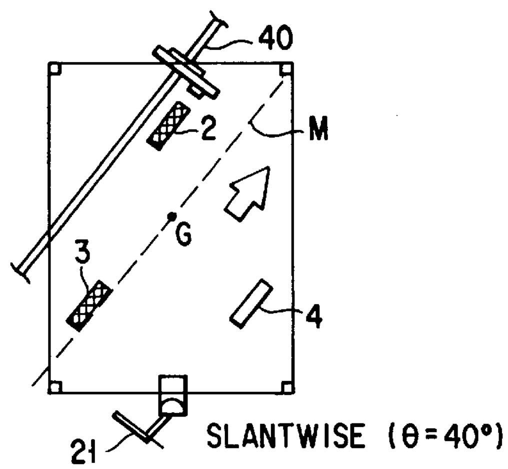
FIG. 12E is a diagram showing the relative positions of the wheels and the track on which the vehicle moves slantwise at 40°.
Figure 12F:
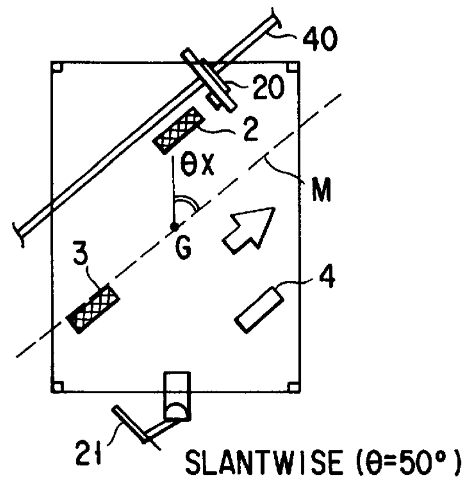
FIG. 12F is a diagram showing the relative positions of the wheels and the track on which the vehicle moves slantwise at 50°.

FIGS. 12A to 12H show the relative positions of the wheels 2, 3 and 4 and a line segment M in the steering direction passing through the gravity center G obtained with the steering angle θ changing from 0° to 90°. When the steering θ exceeds 50° or thereabout, as shown in FIG. 12F, the first and second wheels 2 and 3 start to be situated on the opposite sides with respect to the segment M. In the description to follow, the aforesaid angle (50° in this embodiment) will be referred to as boundary angle θx.

The map shown in FIG. 9 represents an advance drive, in which θ=0° corresponds to a forward (advance) movement of FIG. 12A, and 0<0<θx corresponds to slantwise movements of FIGS. 12B to 12E for steering angles narrower than 50°. Further, θx≦θ<90° corresponds to slantwise movements of FIGS. 12F and 12G for steering angles of 50° or more, and θ=90° corresponds to a sidewise movement of FIG. 12H. The map shown in FIG. 10 represents a retreat drive such that the guided vehicle travels in directions opposite to the directions indicated by the arrows in FIGS. 12A to 12H.

The following is a detailed description of the functions of the control unit 12 and the like. The drive command section 85 of the control unit 12 is connected with the motors 13 and 14 for travel through drivers 90 and 91, respectively. The command section 85 delivers drive commands to the drivers 90 and 91 through a digital-to-analog (D/A) converter (not shown). The motors 13 and 14 are connected with encoders 92 and 93, respectively, for detecting their respective rotational frequencies. Detection signals from the encoders 92 and 93 are fed back to the drivers 90 and 91, respectively, whereby the rotational frequencies of the motors 13 and 14 are kept at desired controlled variables.

The drivers 90 and 91 are provided, respectively, with torque calculating circuits 95 and 96 for calculating torques according to the rotational frequencies and driving currents of the motor 13 and 14, and speed calculating circuits 97 and 98 for calculating the speeds of the first and second wheels 2 and 3 according to the rotational frequencies of the motors 13 and 14. The circuits 95 to 98 are connected to a speed-torque control switching section 99 in the drive command section 85. The switching section 99 serves to switch the control mode for the first and second wheels 2 and 3 between speed control and torque control. Referring now to the map of FIG. 9 and FIGS. 12A to 12H, speed control and torque control will be described.

In the forward movement shown in FIG. 12A, which corresponds to θ=0° in FIG. 9, for example, the first wheel 2 on the front side is subjected to speed control, while the second wheel 3 on the rear side is subjected to torque control such that torque thereon is smaller than torque on the first wheel 2. This is done because if both the first and second wheels 2 and 3 are subjected to speed control during the forward movement, the least speed difference between the wheels 2 and 3 may possibly cause the guided vehicle to meander.

Figure 12G:
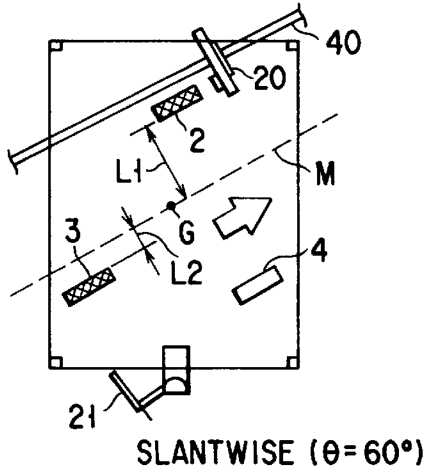
FIG. 12G is a diagram showing the relative positions of the wheels and the track on which the vehicle moves slantwise at 60°.
Figure 12H:
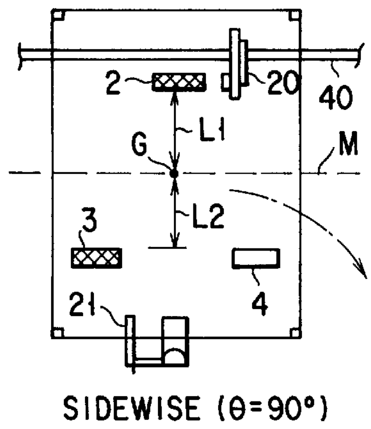
FIG. 12H is a diagram showing the relative positions of the wheels and the track on which the vehicle moves sideways.

During the sidewise movement shown in FIG. 12H, which corresponds to θ=90° in FIG. 9, the first and second wheels 2 and 3 are situated on the opposite sides with respect to the segment M that passes through the gravity center G of the guided vehicle. In this case, if only the first wheel 2 is subjected to speed control in the same manner as during the forward movement, a moment around the gravity center G is generated, so that the guided vehicle inevitably turns in the direction indicated by dashed line in FIG. 12H. During the sidewise movement, therefore, the control mode for the first and second wheels 2 and 3 is switched to speed control.

The following is a description of the steering command section 86. The section 86 is connected with the motors 26 and 50 for steering through steering drivers 100 and 101, respectively. The command section 86 delivers drive commands to the drivers 100 and 101 through a D/A converter (not shown), thereby steering the single-wheel unit 200 and the paired-wheel unit 300. The motors 26 and 50 are connected with the encoders 102 and 103, respectively, for detecting their respective rotational frequencies. Signals outputted from the encoders 102 and 103 are fed back to the drivers 100 and 101, respectively.

The steering mode selection/command control section 87 is connected with the drive command section 85, the steering command section 86, and first and second steering angle detecting sections 104 and 105. The first steering angle detecting section 104 is connected with the individual sensors 29, 30 and 31 of the first steering mechanism 15 and the potentiometer 36. The second steering angle detecting section 105 is connected with the individual sensors 58, 59 and 60 of the second steering mechanism 16 and the potentiometer 64.

The wheel 2 of the single-wheel unit 200 and the wheels 3 and 4 of the paired-wheel unit 300 are controlled in the following two steering modes (angle steering mode and speed difference steering mode). In running the guided vehicle along the track 40 for the forward movement with θ=0°, for example, the steering angle of the second and third wheels 3 and 4 is fixed at 0° (shown in FIG. 9), and the first wheel 2 is subjected to steering angle control. If this control (angle steering mode) is selected, the angle steering command section 87*a* is actuated. Thus, the first wheel 2 is feedback-controlled by means of the potentiometer 36 and the encoder 102, whereby steering angle control along the track 40 is effected. The steering angle of the second and third wheels 3 and 4 is fixed at 0° by means of the sensor plate 57, sensor 59 for 0° detection, etc.

During the sidewise movement (θ=90°), the steering angle of the first wheel 2 is fixed at 90° by means of the sensor plate 28, sensor 30 for 90° detection, etc. The steering angle of the second and third wheels 3 and 4 is fixed at 90° by means of the sensor plate 57 and the sensor 58 for 90° detection. In this case, the speed difference steering command section 87*b* is actuated to execute the speed difference steering mode, and the speed difference between the first and second wheels 2 and 3 is set so that the guided vehicle travels along the track 40.

In this embodiment, the angle θx that defines the boundary between the angle steering mode and the speed difference steering mode during a rightward slantwise movement is at 50°. If the steering angle is narrower than 50°, both the first and second wheels 2 and 3 are situated on one side of the segment M that passes through the gravity center G, so that the guided vehicle cannot be turned around the gravity center G despite the speed difference between the first and second wheels 2 and 3. In the case where the steering angle is narrower than 50°, therefore, the angle steering mode is carried out in the same manner as during the forward movement.

Figure 20:
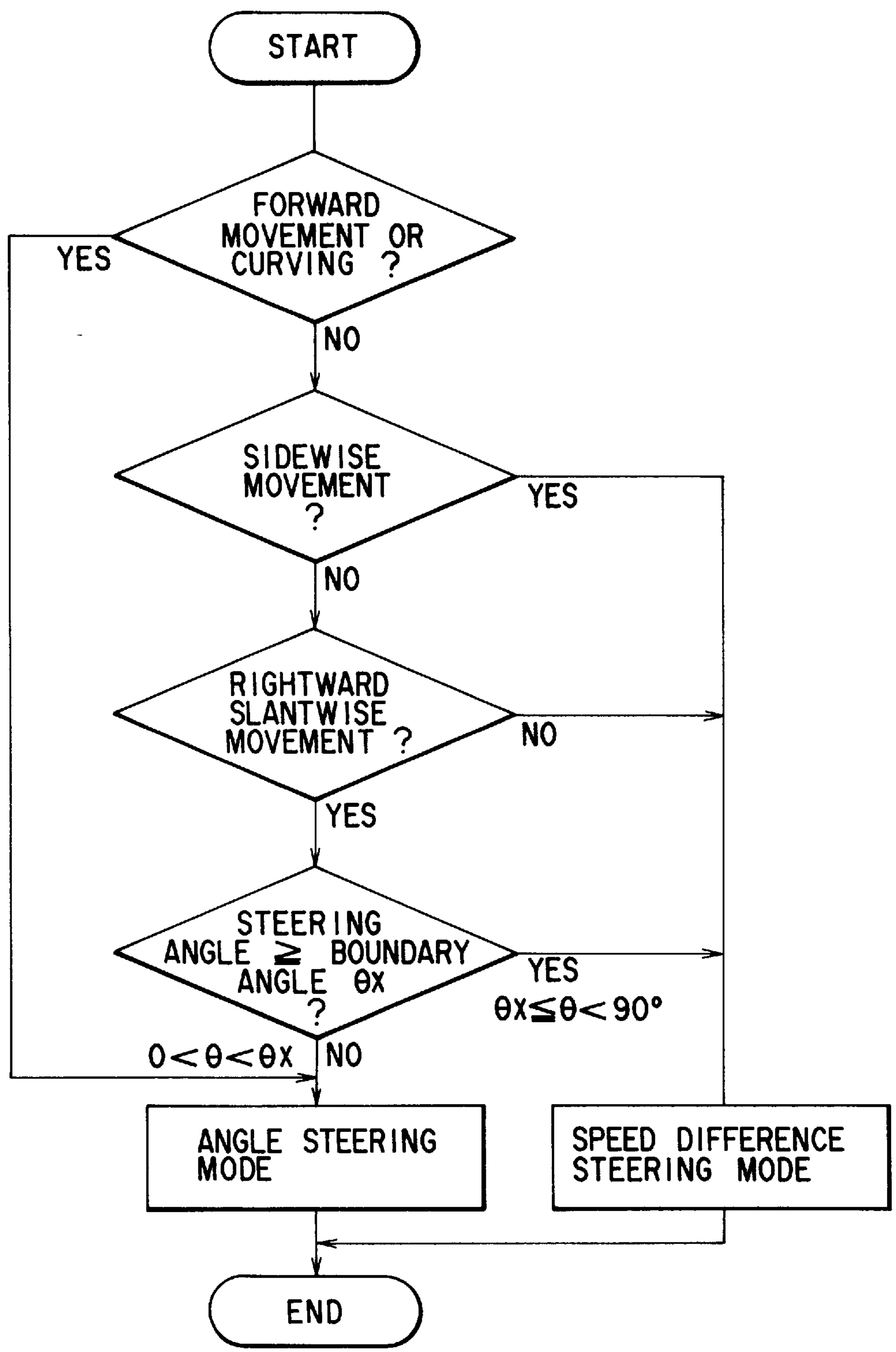
FIG. 20 is a flowchart showing some of the functions of a control unit of the vehicle.

During the rightward slantwise movement, as shown in FIG. 20, the angle steering mode is selected when the steering angle is not less than 0° and narrower than the boundary angle θx, while the speed difference steering mode is selected when the steering angle is not narrower than the boundary angle θx. During a leftward slantwise movement, the first and second wheels 2 and 3 are situated on either side of the segment M without regard to the steering angle, so that the speed difference steering mode is selected. In the speed difference steering mode, the guided vehicle can be turned around the gravity center G by differentiating the respective speeds of the first and second wheels 2 and 3.

The storage section 88 is stored with a necessary steering variable (steering angle or speed difference) for the correction of the deviation between the track 40 and the sensor 20, in the form of a mapped table (not shown). The control section 87 detects the necessary steering variable by applying a detected value from the sensor 20 to the map, and delivers a command to the angle steering command section 87*a* or the speed difference steering command section 87*b*. In executing the speed difference steering mode, it is advisable to set the speed difference in accordance with the ratio between a distance L1 from the segment M to the first wheel 2 and a distance L2 from the segment M to the second wheel 3, as shown in FIG. 12G, for example.

Figure 17:
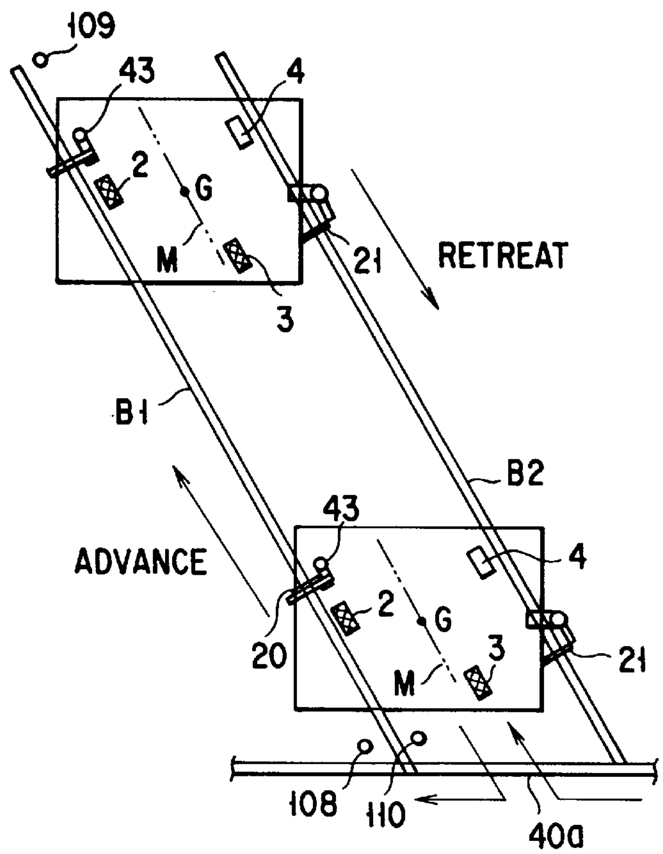
FIG. 17 is a plan view showing the way the vehicle moves slantwise to the right.
Figure 18:
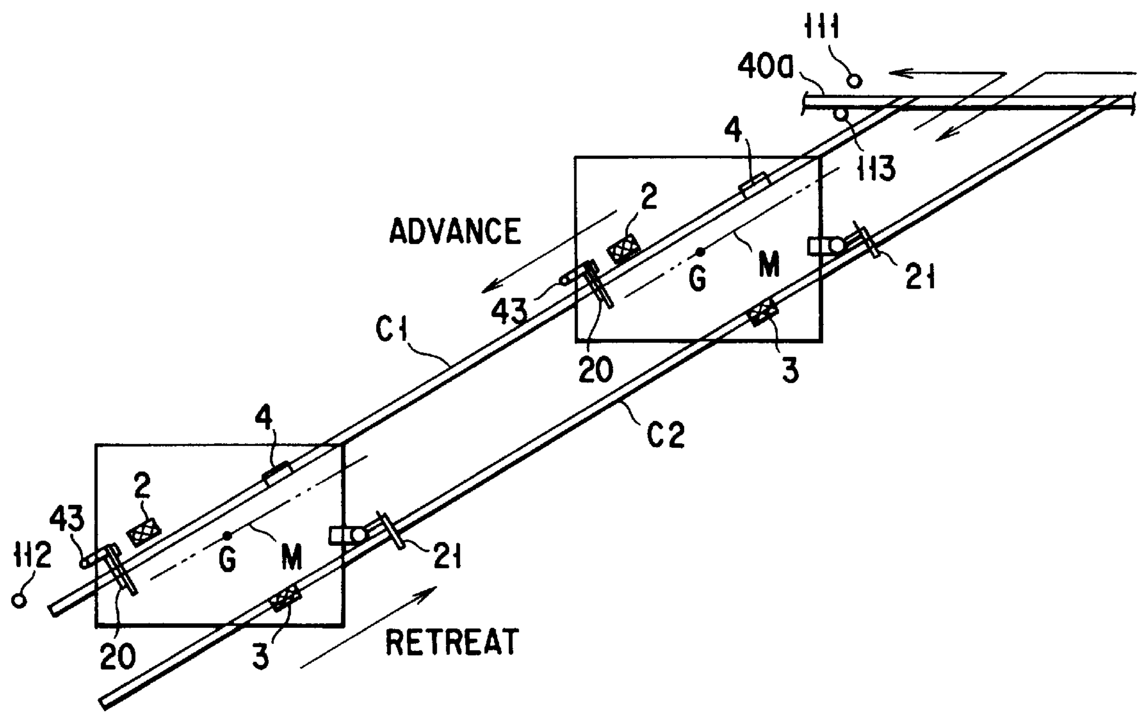
FIG. 18 is a plan view showing the way the vehicle moves slantwise to the left.

In the case of the retreat drive, the first wheel (front wheel) 2 is only controlled in the same manner as the second and third wheels (rear wheels) 3 and 4 in the advance drive, and vice versa, as shown in FIG. 10. In the retreat drive, however, the track 40 is detected by means of the sensor 21 of the second track detecting means 19. As shown in FIGS. 17, 18 and 19, therefore, tracks B1, C1 and D1 for advance and tracks B2, C2 and D2 for retreat, which extend parallel to one another, are used in reciprocating the guided vehicle along the same path of travel without changing its direction.

Figure 13A:
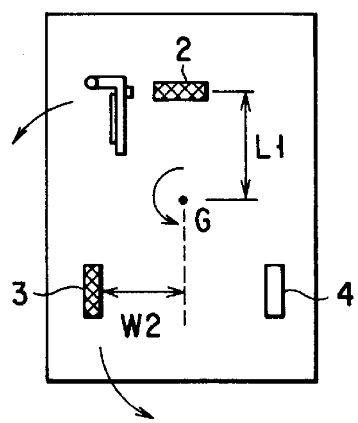
FIG. 13A is a diagram showing the relative positions of the wheels taken when the vehicle spin-turns.
Figure 13B:
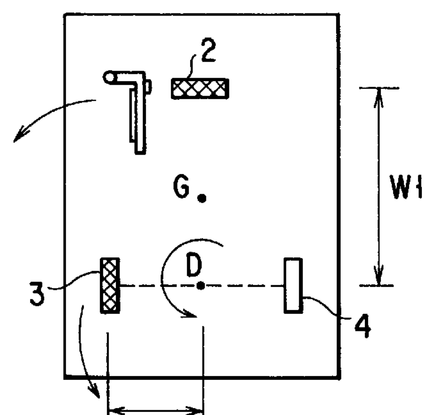
FIG. 13B is a diagram showing the wheel base and tread of the vehicle.

In spin-turning the guided vehicle through 90° or 180°, the turn command section 87*c* is actuated to control the first and second wheels 2 and 3 in accordance with the steering mode shown in the map of FIG. 11. As shown in FIG. 13A, for example, the first and second wheels 2 and 3 are rotated forward and backward, respectively, with the steering angle of the first wheel 2 fixed at 90°. The center of the spin turn can be changed according to the speed ratio between the first and second wheels 2 and 3, and the vehicle can be turned around the gravity center G, for example. Alternatively, the first and second wheels 2 and 3 may be rotated with a speed difference such that the ratio between the respective peripheral speeds of the first and second wheels 2 and 3 is W1:W2, where W1 and W2 are the wheel base from the first wheel 2 to a middle point D between the second and third wheels 3 and 4 and half of the tread between the second and third wheels 3 and 4, respectively, as shown in FIG. 13B. In this case, the guided vehicle spin-turns around the middle point D between the second and third wheels 3 and 4.

Figure 14:
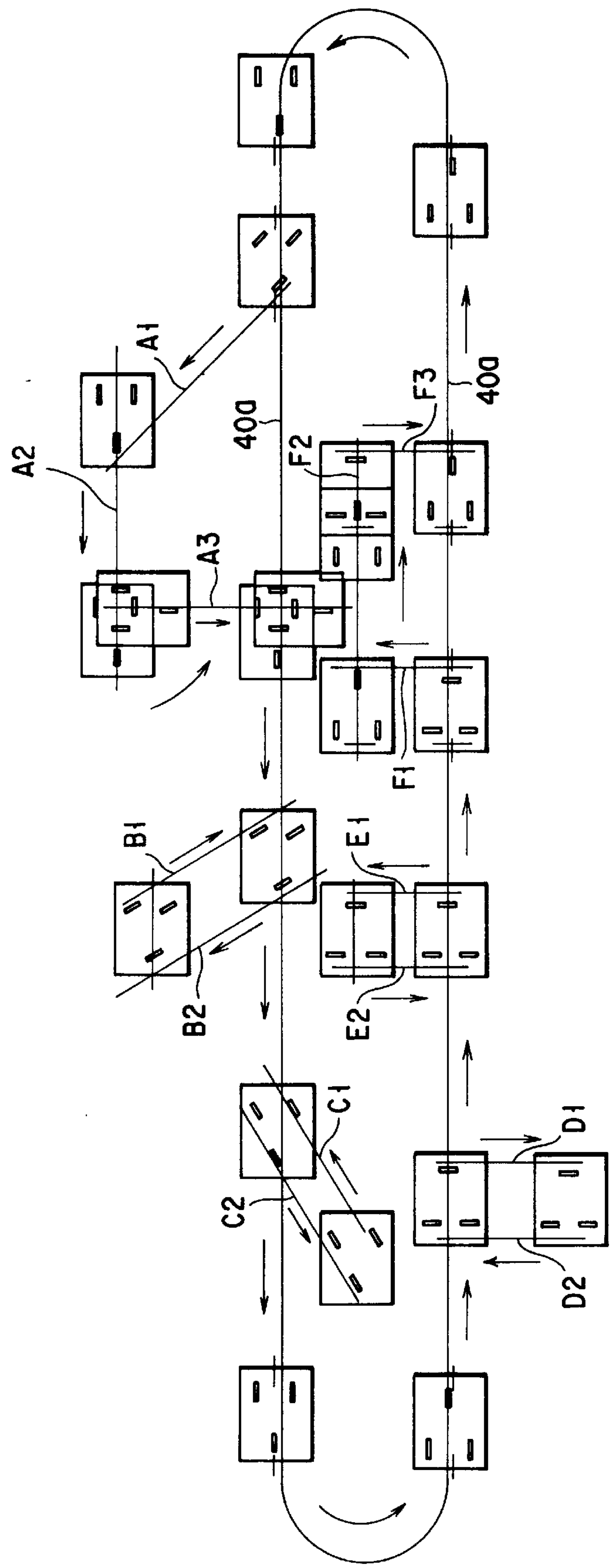
FIG. 14 is a plan view showing the path of travel of the vehicle.

The following is a description of the path of travel of the guided vehicle. FIG. 14 shows an example of the vehicle path. This path includes a closed-loop basic track 40*a*, which is formed of a straight path and a curved path (curvature radius: 500 mm or more) with a relatively wide radius of curvature. The basic track 40*a* is provided with one-way tracks A1, A2 and A3, first slantwise two-way tracks B1 and B2, second slantwise two-way tracks C1 and C2, first sidewise two-way tracks D1 and D2, second sidewise two-way tracks E1 and E2, etc., in predetermined positions.

When the guided vehicle advances along the basic track 40*a*, it is controlled in accordance with the steering mode given by θ=90° in the map of FIG. 9. More specifically, the angle steering command section 87*a* is actuated, the steering angle of the second and third wheels 3 and 4 is fixed at 0°, and the first and second wheels 2 and 3 are subjected to speed control and torque control, respectively. Further, the track is detected by means of the first sensor 20 for track detection as the first wheel 2 is steered.

Figure 15A:
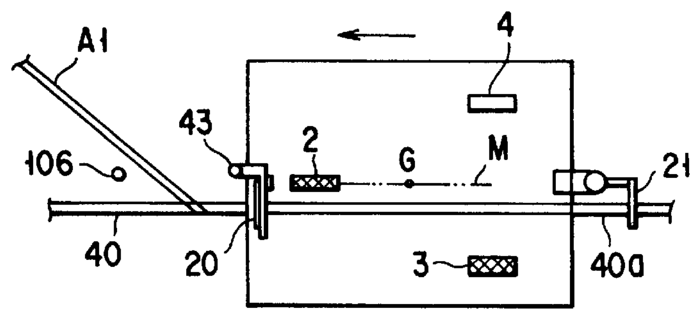
FIG. 15A is a plan view showing the vehicle moving forward.
Figure 15B:
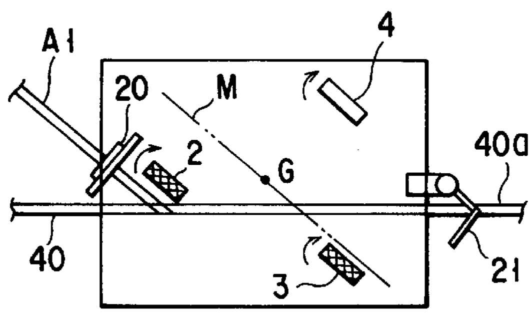
FIG. 15B is a plan view showing a state immediately before the vehicle starts to move slantwise.

The following is a description of a case in which the guided vehicle travels along the basic track 40*a* and the one-way tracks A1, A2 and A3. FIGS. 15A and 15B show a region near the point of intersection of the basic track 40*a* and the one-way track A1. A stopper magnet 106 for stopping the guided vehicle at a predetermined position is embedded in this region. When the vehicle reaches the predetermined position, the magnet 106 is situated right under the sensor 43 of the first track detecting means 18. The control unit 12 causes the guided vehicle to run at low speed just before it reaches the stop position, and stops the motors 13 and 14 for travel when the magnet 106 is detected by the sensor 43.

Then, the control unit 12 fixes the first, second, and third wheels 2, 3 and 4 through 45° in the clockwise direction, as shown in FIG. 15B. Further, the control unit 12 selects the angle steering mode in the column for 0<θ<θx in the map (FIG. 9) stored in the storage section 88, and delivers control signals to the command sections 85 and 86 through the angle steering command section 87*a*. Thus, the steering angle of the second and third wheels 3 and 4 is fixed at θ=45°, and the second and first wheels 3 and 2 are subjected to torque control and speed control, respectively. Also, the first wheel 2 is steered in response to the detection signal from the sensor 20 for track detection. Thereupon, the guided vehicle changes from the basic track 40*a* to the slantwise track A1, and travels along the track A1. In changing from the slantwise track A1 to the forward track A2, the vehicle is controlled in a contrary manner as compared to the case of the change from the basic track 40*a* to the track A1.

Figure 16A:
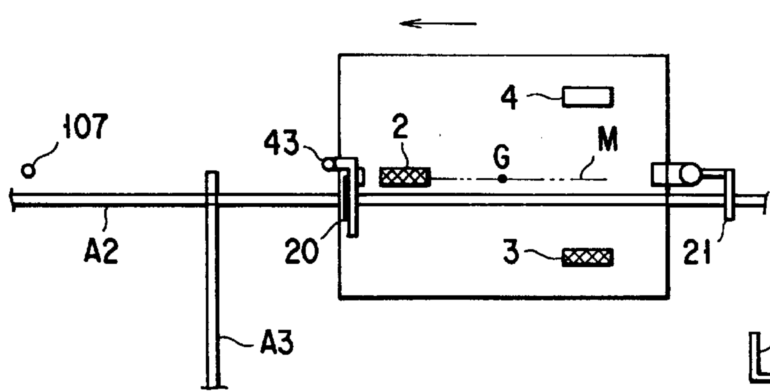
FIG. 16A is a plan view showing a state before a spin turn of the vehicle.
Figure 16B:
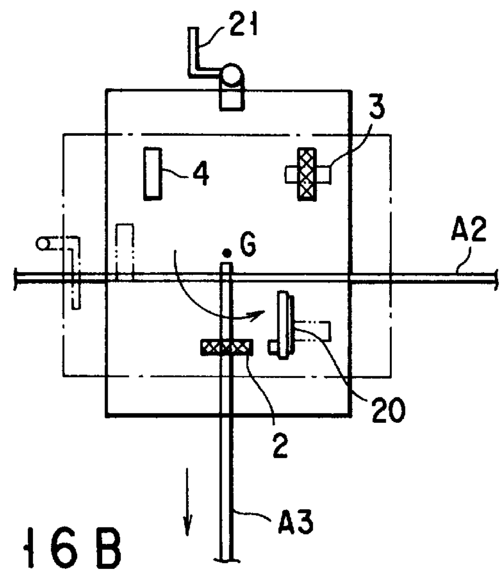
FIG. 16B is a plan view showing a state immediately after the spin turn of the vehicle.

In changing from the track A2 to the track A3, the guided vehicle spin-turns through 90°, as shown in FIGS. 16A and 16B. More specifically, the control unit 12 stops the vehicle when a stopper magnet 107 is detected by the sensor 20. Thereafter, the turn command section 87*c* is caused to carry out spin-turn control for θ=90° in the map of FIG. 11. In this case, the control unit 12 fixes the steering angle of the first wheel 2 at 90°, and rotates the first and second wheels 2 and 3 with the aforesaid speed difference. Thereupon, the guided vehicle spin-turns through 90° from the position indicated by dashed line to the position indicated by full line in FIG. 16B. After the spin turn is finished, the control unit 12 restores the steering angle of the first wheel 2 to 0°, and then executes the steering mode in the column for θ=0° in the map shown in FIG. 9, thereby causing the guided vehicle to move forward or toward the basic track 40*a* along the track A3. When the point of intersection track A3 and the basic track 40*a* is reached, the guided vehicle is spin-turned through 90° in the same manner as aforesaid, and is returned to the basic track 40*a*.

Referring now to FIG. 17, reciprocation along the rightward slantwise tracks (60°) B1 and B2 beside the basic track 40*a* will be described. In this case, the guided vehicle stops when the sensor 43 detects a stopper magnet 108 at the point of intersection of the basic track 40*a* and the track B1. Then, the control unit 12 steers the first, second, and third wheels 2, 3 and 4 through 60° in the clockwise direction, as shown in FIG. 12G. Since this steering angle is wider than the boundary angle θx, the control unit 12 selects the speed difference steering mode, whereupon it runs the guided vehicle along the track B1 while causing the speed difference steering command section 87*b* to effect speed difference control for the first and second wheels 2 and 3.

When the sensor 43 detects a stopper magnet 109, the guided vehicle is stopped. Then, the control unit 12 causes the vehicle to retreat toward the basic track 40*a* along the track B2. Also in this case, the steering angle is fixed at 60°, and the speed difference steering command section 87*b* is caused to execute the speed difference steering mode. At this time, the track B2 is detected by the second sensor 21 for track detection. When the sensor 43 detects a stopper magnet 110, the guided vehicle is stopped.

Referring now to FIG. 18, reciprocation along the leftward slantwise tracks (30°) C1 and C2 beside the basic track 40*a* will be described. The guided vehicle stops when the sensor 43 detects a stopper magnet 111 at the point of intersection of the basic track 40*a* and the track C1. Then, the control unit 12 steers the wheels 2, 3 and 4 through 30° in the counterclockwise direction. For this leftward slantwise movement, the speed difference steering mode is executed without regard to the steering angle. More specifically, the wheels 2 and 3 are subjected to speed difference control in response to the detection signal from the sensor 20 for track detection as the guided vehicle travels along the track C1. When the sensor 43 detects a stopper magnet 112, the vehicle stops. Then, the control unit 12 causes the vehicle to retreat along the track C2. Also in this case, the steering angle is fixed at counterclockwise-30°, and the speed difference steering mode is executed. At this time, the track C2 is detected by the second sensor 21 for track detection. When the sensor 43 detects a stopper magnet 113, the guided vehicle is stopped.

Referring now to FIG. 19, travel along the sidewise two-way tracks D1 and D2 will be described. When the sensor 43 detects a stopper magnet 114, the guided vehicle stops. Then, the control unit 12 changes the steering. angle of the wheels 2, 3 and 4 to 90°, as shown in FIG. 12H. The speed difference steering command section 87*b* is caused to effect speed difference control for the first and second wheels 2 and 3, whereupon the vehicle is caused to travel sideways along the track D1. When the sensor 43 detects a stopper magnet 115, the vehicle is stopped. Thereafter, the control unit 12 causes the vehicle to retreat along the track D2 while subjecting the first and second wheels 2 and 3 to the speed difference control without changing the steering angle θ=90°. The track D2 for retreat is detected by the second sensor 21. When the sensor 43 detects a stopper magnet 116, the guided vehicle is stopped. A description of the sidewise two-way tracks E1 and E2 shown in FIG. 14 is omitted, since they are controlled substantially in the same manner as the tracks D1 and D2. In FIG. 14, symbols F1 and F3 designate sidewise one-way tracks, and F2 a forward one-way track.

As described above, when the automatically guided vehicle according to this embodiment is moving forward or curving, that wheel (first wheel 2 for the case of the advance drive) which is situated on the front side in the moving direction is controlled in speed as it is subjected to angle steering control. The wheel on the rear side is subjected to torque control such that its steering angle is fixed at 0° and the torque thereon is smaller than the torque on the wheel on the front side. During a sidewise movement, the steering angle of any of the wheels is fixed at 90°, and the first and second wheels 2 and 3 are subjected to speed difference control. The speed difference steering mode is executed only when the first and second wheels 2 and 3 are situated on either side of the segment M in the moving direction that passes through the gravity center G, and the angle steering mode is executed if not so.

According to the automatically guided vehicle arranged in this manner, an optimum steering mode can be selected in accordance with the moving direction, so that the vehicle can travel along the track without meandering. During the forward and sidewise movements, the respective steering angles of the wheels 2, 3 and 4 can be accurately fixed by means of the sensors 29 to 31 and 58 to 60 for 0°, clockwise-90°, and counterclockwise-90° detection. Since the guided vehicle requires only one drive wheel on each side, front or rear, the underside of the vehicle can be made compact, thus facilitating simplification in construction and reduction in weight and in cost.

The accuracy of steering angle fixation for slantwise movements may be improved by providing a sensor for angle detection with every 10°, for example, in place of the sensors 29 to 31 and 58 to 60 as the steering angle detecting means. The sensors for detecting the track and the stop positions are not limited to magnetic means, and may alternatively be optical or radio-guided detecting means. The wheels may be arranged so that they include one rear wheel and two front wheels. In executing the angle steering mode, moreover, the steering angle of the rear wheels may be controlled with that of the front wheel fixed. Furthermore, the first track detecting means 18, like the second track detecting means 19, may be retained for swinging motion by means of a holder on the base 5.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An automatically guided vehicle capable of traveling on a floor provided with a fixed track comprising:

a base including a front portion and a rear portion;

a single-wheel unit including a first wheel attached to one of the front and rear portions of the base and supported on the base so as to be swingable around a vertical axis;

a paired-wheel unit including second and third wheels arranged right and left and independently of each other on the other of the front and rear portions of the base and supported on the base so as to be swingable around vertical axes, individually;

first rotating means including a motor for travel used to rotate the first wheel;

first steering means including a motor for steering used to swing the first wheel around the vertical axis;

second rotating means including a motor for travel used to rotate at least one of the second and third wheel independently of the first wheel;

second steering means including a motor for steering used to swing at least one of the second and third wheel around the vertical axis or axes independently of the first wheel;

track detecting means for detecting the track; and a control unit for controlling the first and second rotating means and the first and second steering means, the control unit including means for rotating the individual wheels of the single-wheel unit and the paired-wheel unit independently of one another, thereby running the guided vehicle, and controlling at least one of the single-wheel unit and the paired -wheel unit in a direction such that a deviation in position between the track and the guided vehicle detected by the track detecting means is corrected, thereby steering the guided vehicle;

said second wheel being a drive wheel rotated by means of the motor for travel of the second rotating means, and said third wheel being an idler wheel capable of free rotation;

said controller unit includes angle steering means for executing an angle steering mode such that the steering angle of one of the single and paired-wheel units is controlled with the steering angle of the other unit fixed, thereby correcting the deviation in position between the track and the guided vehicle as the guided vehicle is operated, speed difference steering means for executing a speed difference steering mode such that the respective rotational speeds of the first and second wheels are differentiated from each other with the respective steering angles of the single and paired-wheel units fixed, thereby correcting the deviation in position between the track and the guided vehicle as the guided vehicle is operated, and steering mode selecting means for selecting the angle steering mode or the speed difference steering mode in accordance with the respective steering angles of the single and paired-wheel units and delivering a steering command to the angle steering means or the speed difference steering means;

said steering mode selecting means selects the speed difference steering mode and delivers the command to the speed difference steering means when the respective steering angles of the single and paired-wheel units are set at values such that the first and second wheels are situated on the opposite sides with respect to a line segment in the steering direction passing through the center of gravity of the guided vehicle, and selects the angle steering mode and delivers the command to the angle steering means when the steering angles are set at any other values.

2. An automatically guided vehicle capable of traveling on a floor provided with a fixed track comprising:

a base including a front portion and a rear portion;

a single-wheel unit including a first wheel attached to one of the front and rear portions of the base and supported on the base so as to be swingable around a vertical axis;

a paired-wheel unit including second and third wheels arranged right and left and independently of each other on the other of the front and rear portions of the base and supported on the base so as to be swingable around vertical axes, individually;

first rotating means including a motor for travel used to rotate the first wheel;

first steering means including a motor for steering used to swing the first wheel around the vertical axis;

second rotating means including a motor for travel used to rotate at least one of the second and third wheel independently of the first wheel;

second steering means including a motor for steering used to swing at least one of the second and third wheel around the vertical axis or axes independently of the first wheel;

track detecting means for detecting the track; and a control unit for controlling the first and second rotating means and the first and second steering means, the control unit including means for rotating the individual wheels of the single-wheel unit and the paired-wheel unit independently of one another, thereby running the guided vehicle, and controlling at least one of the single-wheel unit and the paired -wheel unit in a direction such that a deviation in position between the track and the guided vehicle detected by the track detecting means is corrected, thereby steering the guided vehicle;

said second wheel being a drive wheel rotated by means of the motor for travel of the second rotating means, and said third wheel being an idler wheel capable of free rotation;

said controller unit includes angle steering means for executing an angle steering mode such that the steering angle of one of the single and paired-wheel units is controlled with the steering angle of the other unit fixed, thereby correcting the deviation in position between the track and the guided vehicle as the guided vehicle is operated, speed difference steering means for executing a speed difference steering mode such that the respective rotational speeds of the first and second wheels are differentiated from each other with the respective steering angles of the single and paired-wheel units fixed, thereby correcting the deviation in position between the track and the guided vehicle as the guided vehicle is operated, and steering mode selecting means for selecting the angle steering mode or the speed difference steering mode in accordance with the respective steering angles of the single and paired-wheel units and delivering a steering command to the angle steering means or the speed difference steering means;

said angle steering means includes means for effecting torque control such that a driving torque on that one of the first and second wheels which is situated on the rear side in the moving direction thereof is smaller than a driving torque on the wheel of the front side.

3. An automatically guided vehicle capable of traveling on a floor provided with a fixed track comprising:

a base including a front portion and a rear portion;

a single-wheel unit including a first wheel attached to one of the front and rear portions of the base and supported on the base so as to be swingable around a vertical axis;

a paired-wheel unit including second and third wheels arranged right and left and independently of each other on the other of the front and rear portions of the base and supported on the base so as to be swingable around vertical axes, individually;

first rotating means including a motor for travel used to rotate the first wheel;

first steering means including a motor for steering used to swing the first wheel around the vertical axis;

second rotating means including a motor for travel used to rotate at least one of the second and third wheel independently of the first wheel;

second steering means including a motor for steering used to swing at least one of the second and third wheel around the vertical axis or axes independently of the first wheel;

track detecting means for detecting the track; and a control unit for controlling the first and second rotating means and the first and second steering means, the control unit including means for rotating the individual wheels of the single-wheel unit and the paired-wheel unit independently of one another, thereby running the guided vehicle, and controlling at least one of the single-wheel unit and the paired -wheel unit in a direction such that a deviation in position between the track and the guided vehicle detected by the track detecting means is corrected, thereby steering the guided vehicle;

said second wheel being a drive wheel rotated by means of the motor for travel of the second rotating means, and said third wheel being an idler wheel capable of free rotation;

said paired-wheel unit includes a bracket supporting the second wheel and a bracket supporting the third wheel, the bracket for the second wheel being fitted with the motor for travel used to rotate the second wheel, and the bracket for the third wheel being fitted with a housing serving also as a balance weight for weight balancing with the motor for travel, the housing containing a speed sensor for detecting the rotational speed of the third wheel.

4. An automatically guided vehicle capable of traveling on a floor provided with a fixed track comprising:

a base including a front portion and a rear portion;

a single-wheel unit including a first wheel attached to one of the front and rear portions of the base and supported on the base so as to be swingable around a vertical axis;

a paired-wheel unit including second and third wheels arranged right and left and independently of each other on the other of the front and rear portions of the base and supported on the base so as to be swingable around vertical axes, individually;

first rotating means including a motor for travel used to rotate the first wheel;

first steering means including a motor for steering used to swing the first wheel around the vertical axis;

second rotating means including a motor for travel used to rotate at least one of the second and third wheel independently of the first wheel;

second steering means including a motor for steering used to swing at least one of the second and third wheel around the vertical axis or axes independently of the first wheel;

track detecting means for detecting the track; and a control unit for controlling the first and second rotating means and the first and second steering means, the control unit including means for rotating the individual wheels of the single-wheel unit and the paired-wheel unit independently of one another, thereby running the guided vehicle, and controlling at least one of the single-wheel unit and the paired -wheel unit in a direction such that a deviation in position between the track and the guided vehicle detected by the track detecting means is corrected, thereby steering the guided vehicle;

said second wheel being a drive wheel rotated by means of the motor for travel of the second rotating means, and said third wheel being an idler wheel capable of free rotation;

said control unit includes spin-turn means for spin-turn means for spin-turning the guided vehicle by simultaneously rotating the first and second wheels with the steering angle of the first wheel fixed at 90° and with the steering angle of second and third wheels fixed at 0°.

5. The automatically guided vehicle according to claim 4, wherein said control unit includes means for rotating the first and second wheels with a difference in rotational speed such that the ratio between the respective peripheral speeds of the first and second wheels is W1:W2, where W1 and W2 are the wheel base from the first wheel to the middle point between the second and third wheels and half of the tread between the second and third wheels, respectively, as the guided vehicle is spin-turned.

* * * * *